(12) United States Patent
Dent

(10) Patent No.: US 8,014,436 B2
(45) Date of Patent: Sep. 6, 2011

(54) MULTI-DIMENSIONAL SIGNAL OF REDUCED PEAK-TO-RMS RATIO

(75) Inventor: Paul Dent, Pittsboro, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 638 days.

(21) Appl. No.: 12/166,910

(22) Filed: Jul. 2, 2008

(65) Prior Publication Data

US 2010/0002751 A1    Jan. 7, 2010

(51) Int. Cl.
*H04B 1/00* (2006.01)
(52) U.S. Cl. ........ 375/141; 375/142; 375/260; 375/267; 375/296; 370/204; 370/205; 370/206
(58) Field of Classification Search ............ 375/260, 375/267, 98, 141, 295, 296, 298, 142; 370/204, 370/205, 206
See application file for complete search history.

(56) References Cited

U.S. PATENT DOCUMENTS

| 4,084,337 | A | 4/1978 | Tucker |
| 4,597,090 | A | 6/1986 | Forney |
| 7,173,973 | B2 * | 2/2007 | Borran et al. ......... 375/260 |
| 7,310,379 | B2 * | 12/2007 | Sibecas et al. ......... 375/267 |

OTHER PUBLICATIONS

Welti, G.; Jhong Lee "Digital Transmission with Four Dimensional modulation" Information Theory, IEEE Transactions on vol. 20, Issue 4. Jul. 1974 pp. 497-502.

* cited by examiner

*Primary Examiner* — Chieh M Fan
*Assistant Examiner* — Fitwi Hailegiorgis

(57) ABSTRACT

A transmitter and a method are described herein that can generate a radio signal with a reduced ratio of peak amplitude to root-mean-square amplitude which helps to improve the transmit efficiency of the transmitter's power amplifier. In addition, a receiver is also described herein that can decode the radio signal.

12 Claims, 10 Drawing Sheets

MULTI-DIMENSIONAL SIGNAL OF REDUCED PEAK-TO-RMS RATIO

CROSS REFERENCE TO RELATED APPLICATION

This application is related to U.S. patent application Ser. No. 12/166,883 filed concurrently herewith and entitled "Reduced Peak-to-RMS Ratio Multicode Signal". The contents of this document are hereby incorporated by reference herein.

TECHNICAL FIELD

The present invention relates in general to the wireless telecommunications field and, in particular, to a transmitter and a method for generating a radio signal with a reduced ratio of peak amplitude to root-mean-square amplitude which helps to improve the transmit efficiency of the transmitter's power amplifier. In addition, the present invention relates to a receiver that can decode the radio signal.

BACKGROUND

The following abbreviations are herewith defined, at least some of which are referred to within the following description of the prior art and the present invention.
CDMA Code-Division Multiple Access
FIR Finite Impulse Response
HSPA High-Speed Packet Access
PA Power Amplifier
PCM Pulse Code Modulation
PSK Phase Shift Keying
QAM Quadrature Amplitude Modulation
UMTS Universal Mobile Telecommunications Service
WCDMA Wideband Code-Division Multiple Access It is well known in the art that a communications signal such as a radio signal can be thought of as having an instantaneous complex value on a two-dimensional complex plane, where the coordinate in one dimension is the signed amplitude of a sinusoidal component of the radio signal and the coordinate in the second dimension is the signed amplitude of a cosinusoidal component of the radio signal. Since the cosine function and the sine function are mutually orthogonal functions, their correlation is zero, which means that the two dimensions are at right angles with respect to each other. The two dimensions are commonly labeled I and Q for "In-phase" and "Quadrature". No other orthogonal dimensions exist in this signal space, which is a plane. It is also well known that symbols representing groups of bits can be located on the I, Q plane such that any two symbols are sufficiently separated from one another to avoid confusion, so long as the signal-to-noise ratio is high enough. For example, 16 symbols can be located on a 4×4 grid known as 16QAM, and four binary bits assigned to each point. In 64QAM, 64 symbols can be located on a 8×8 grid and 6 binary bits assigned to each point. Non-rectangular constellations of points can also be used, for example 16-PSK (phase shift keying) in which 16 points are equispaced in angle around a circle, and 4 binary bits are allocated to each of the points.

In the prior art, it is generally considered to be desirable and known to allocate bit groups to symbol points according to a Grey coding scheme such that the bits assigned to adjacent points in the signal space differ in as few bit positions as possible, ideally in only one bit position. A brief discussion is provided next about some of these well known schemes and their drawbacks that are associated with the prior art.

U.S. Pat. No. 4,084,337, filed Aug. 24, 1976, describes a 4-dimensional modulation scheme in which both radio wave polarizations are used to provide two independent channels, where each channel is capable of carrying a two-dimensional signal. In this patent, there is reference to an IEEE paper entitled "Digital Transmission with Four Dimensional modulation" (Trans IEEE on Information Theory, July 1974, pp. 497-502) in which there is described a four dimensional modulation scheme that is constructed to have a peak energy constraint. The peak energy constraint was described therein to mean that the sum of the powers in the two polarizations should not exceed some maximum value. For instance, if (I1,Q1) are the In-phase and Quadrature Phase components on one polarization and (I2,Q2) are the In-phase and Quadrature Phase components on the other polarization, then the total energy or power which is constrained is given by $I1^2+Q1^2+I2^2+Q2^2$. This is a relevant and adequate constraint when (I1,Q1) and (I2,Q2) are separately generated and applied to physically independent channels, such as orthogonally polarized antennas. However, if (I1,Q1) and (I2,Q2) are not separately generated and not applied to physically separate channels, but instead are applied to the same physical channel, then the transmitted signal would be (I1+I2,Q1+Q2) and its energy or power would be proportional to $(I1+I2)^2+(Q1+Q2)^2$, which is not constrained by the same metric. Thus a different scheme is needed in order to constrain the peak energy in the latter case.

U.S. Pat. No. 4,597,090, filed Apr. 14, 1983, discloses a modulation scheme for a single physical channel in which the two dimensions in signal space (I,Q) on m sequential signal samples are considered to form a 2 m dimensional space, and where mN data bits are encoded into the 2 m dimensions in such a way as to obtain a coding gain by constraining the selection of I,Q value of one signal sample to depend on the selection of I,Q values for the other signal samples. This is a form of Trellis Coding, and is related to obtaining a coding gain but is silent about obtaining a reduction of the peak-to-rms ratio of the radio signal which is a subject that is related to the present discussion.

The 3rd Generation cellular system known as WCDMA or UMTS, currently has a method under specification known as HSPA which enables the transmission of higher data rates from a mobile phone to a network (or base station). The HSPA transmission uses an approach called "Multi-code CDMA". In this Multi-code CDMA system, each data symbol is spread out in time and spectrum by combining it with a spreading code. On the downlink (base station to mobile phone), the codes used to transmit signals from the base station are coordinated at the base station so that they are mutually orthogonal. In contrast, in the uplink (mobile phone to base station), the coordination needed between different mobile phones to achieve orthogonality is considered too difficult to implement, so each mobile phone uses a different random code sequence.

However, at each mobile phone, it is still possible to generate several random code sequences that are coordinated among themselves to be mutually orthogonal. Each of these orthogonal codes may then carry a symbol sub-stream so that the combined symbol stream rate is enhanced. But, in this situation, the mobile phone's available transmitter power is going to be divided between the different codes which means that the range over which each sub-stream may be successfully received and decoded error free is going to be reduced. In fact, the reduction of power per each sub-stream in a multi-code modulation signal transmitted from a mobile phone is worse than would be expected by merely dividing the transmitter power by the total number of sub-streams. This is because it is not so much the average power that is constrained by battery voltage, but rather the peak signal amplitude, which happens to be limited by the battery voltage.

Thus, in the 3rd Generation cellular system there is a desire for a modulation scheme which develops the greatest mean power per each sub-stream within a constraint of the composite peak signal amplitude of all sub-streams. For example, if the mobile phone used a three-code multicode scheme with three length=4 codes where each code carried a sub-stream of 16QAM symbols at similar amplitude, then the total mean power that is transmitted within a given peak amplitude constraint is 7.32 dB below the peak before filtering to contain the spectrum, and the mean power per sub-stream is 12.1 dB below the peak. Filtering generally increases the peak-to-rms ratio further. The HSPA standard describes an improvement over the three length=4 spreading code scheme since it specifies a length=2 code of twice the power ($\sqrt{2}$ times the amplitude) which carries two symbols in the same time period that a superimposed and orthogonal length=4 code carries a third symbol, which effectively achieves the same symbol rate as three length=4 codes. This 4+(2,2) configuration is able to develop a total mean power which is 5.44 dB below the peak, and is 1.88 dB more effective than the 4+4+4 configuration that is associated with the three length=4 spreading code scheme.

However, with the 4+(2,2) configuration there is a reduction of the spreading factor, which is merely a move in the direction of no spreading which also achieves a low peak-to-rms ratio, but the resulting radio signal becomes very difficult to decode when there is a significant amount of multipath channel distortion. In view of the foregoing, it can be seen that there has been and is still a need for a transmitter and a method that can address the aforementioned shortcomings and other shortcomings associated with the prior art. These needs and other needs are addressed by the transmitter and the method of the present invention.

SUMMARY

In one aspect, the present invention provides a method for reducing a peak-to-rms ratio in a transmitted radio signal while placing a limit on the peak composite symbol amplitude when utilizing multi-dimensional modulation. The method includes the steps of: (a) encoding information into a stream of binary bits; (b) forming a plurality of groups of bits from the stream of binary bits, wherein the plurality of groups of bits represent a plurality of data symbols; (c) representing each data symbol by a set of coordinates in a multidimensional space, wherein a number of dimensions in the multi-dimensional space correspond to a number of at least three orthogonal components which eventually comprise the transmitted radio signal; and (d) choosing coordinates for each data symbol such that each data symbol is located at a minimum distance away from a nearest other data symbol in the multidimensional space and also such that the peak composite symbol amplitude to root-mean-square amplitude of the transmitted radio signal is minimized. This method of generating a radio signal with a reduced ratio of peak amplitude to root-mean-square amplitude helps to improve the transmit efficiency of a transmitter's power amplifier.

In another aspect, the present invention provides a method of communicating data symbols resulting in a transmitted signal with a reduced ratio of peak amplitude to root-mean-square amplitude. The method includes the steps of: (a) simultaneously using multiple, additively-combined, spread-spectrum codes each carrying an In-phase or real signal value and a Quadrature phase or imaginary signal value to provide at least three independent modulation dimensions, each dimension carrying a coordinate value; and (b) defining a set of constellation points to be associated with the data symbols, the constellation points distributed within a space comprised of the at least three dimensions such that a Euclidean distance between any two of the constellation points is not less than a desired minimum and such that a desired peak amplitude value is not exceeded by any point, the peak value being determined by any of the following measures: (i) a sum of absolute values of the coordinates of any constellation point corresponding to the dimensions provided by the real signal values carried by the multiple, additively-combined, spread-spectrum codes; (ii) a sum of the absolute values of the coordinates of any constellation point corresponding to the dimensions provided by the imaginary signal values carried by the multiple, additively-combined, spread-spectrum codes; and (iii) a sum of the squares of (a) the sum of the absolute values of the coordinates of any constellation point corresponding to the dimensions provided by the real signal values carried by the multiple, additively-combined, spread-spectrum codes; and (b) the sum of the absolute values of the constellation coordinates of any point corresponding to the dimensions provided by the imaginary signal values carried by the multiple, additively-combined, spread-spectrum codes. This method of generating a radio signal with a reduced ratio of peak amplitude to root-mean-square amplitude helps to improve the transmit efficiency of a transmitter's power amplifier.

In still yet another aspect, the present invention provides a transmitter that reduces a peak-to-rms ratio in a radio signal while placing a limit on the peak composite symbol amplitude when utilizing multi-dimensional modulation. The transmitter includes: (a) an encoder that divides groups of data bits into a first subgroup and a second subgroup; (b) the encoder uses the first subgroup of bits to select one of a number of constellation points that are distributed within a first multi-dimensional space, where a location of the constellation points have been determined such that a sum of their coordinates is less than a desired maximum value, where the coordinates of the selected constellation point are used to set values of real parts of corresponding complex numbers; (c) the encoder uses the second subgroup of bits to select another one of a number of constellation points that are distributed within a second multidimensional space, where a location of the constellation points have been determined such that a sum of their coordinates is less than a desired maximum value, where the coordinates of the selected constellation point are then used to set values of imaginary parts of corresponding complex numbers; (d) the encoder pairs one real and one imaginary part to form a complex number and the remaining real and imaginary parts are paired likewise to obtain a set of complex numbers; (e) the encoder assigns the complex numbers to be multiplied by an associated one of a number of multi-chip orthogonal codes, where products of each complex number with its code are subsequently added chip-wise to obtain a multi-code symbol; (f) a filter that receives a stream of the multicode symbols and filters them to constrain a transmitted spectrum; (g) a modulator that modulates the filtered signal with a radio frequency carrier; and (h) an antenna that transmits the modulated radio signal. Thus by generating a radio signal with a reduced ratio of peak amplitude to root-mean-square amplitude the transmit efficiency of the transmitter's power amplifier is improved.

In yet another aspect, the present invention provides a receiver that decodes a radio signal which has a reduced peak-to-rms ratio and a limited peak composite symbol amplitude. In one embodiment, the receiver includes a decoder with a processor that implements processor-executable instructions from a memory to decode the radio signal by: (a) determining a facet of a diamond-shaped constellation on or within which a data symbol of the radio signal lies; (b) determining a subset of points on the facet within which the data symbol of the radio signal lies; (c) determining a point within the subset of points which is closest to coordinate values of the data symbol; and (d) determining the data symbol from the combination of the facet, the subset of points, and the closest point.

In still yet another aspect, the present invention provides a receiver that decodes a radio signal which has a reduced peak-to-rms ratio and a limited peak composite symbol amplitude. In one embodiment, the receiver includes a decoder with a processor that implements processor-executable instructions from a memory to decode the radio signal by: (a) hypothesizing a first of multiple constellation points on a first diamond-shaped constellation where the first constellation point is associated with a data symbol of the radio signal; (b) determining, given the hypothesized first constellation point, a second constellation point on a second diamond-shaped constellation where the second constellation point is associated with a data symbol of the radio signal; (c) determining a metric describing how accurately the hypothesized first constellation point and the associated determined second constellation point predict the received radio signal; and (d) comparing the metric for all possible hypotheses of the first constellation point and selecting the hypothesis having the best metric as the correct hypothesis, thereby decoding the radio signal.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

The present invention includes a transmitter (e.g., incorporated within a mobile phone) and a method that reduces the peak-to-rms ratio in a radio signal while placing a limit on the peak composite symbol amplitude when utilizing multi-dimensional modulation. In particular, the transmitter encodes information into a stream of binary bits and groups of bits are combined to be represented by data symbols. Then, each data symbol is represented by a set of coordinates in a multidimensional space, where the number of dimensions in the multidimensional space correspond to at least three orthogonal components which will comprise the transmitted radio signal. The coordinates of each data symbol are chosen such that each data symbol is located at a minimum distance away from the nearest other data symbol in the multidimensional space and also such that the peak amplitude to root-mean-square amplitude of the transmitted radio signal is minimized. A detailed discussion about different ways the present invention can be implemented is provided after describing in more detail the aforementioned traditional three-code multicode scheme which has the 4+4+4 configuration and the aforementioned traditional HSPA three-code multicode scheme which has the 4+(2,2) configuration.

Figure 1:
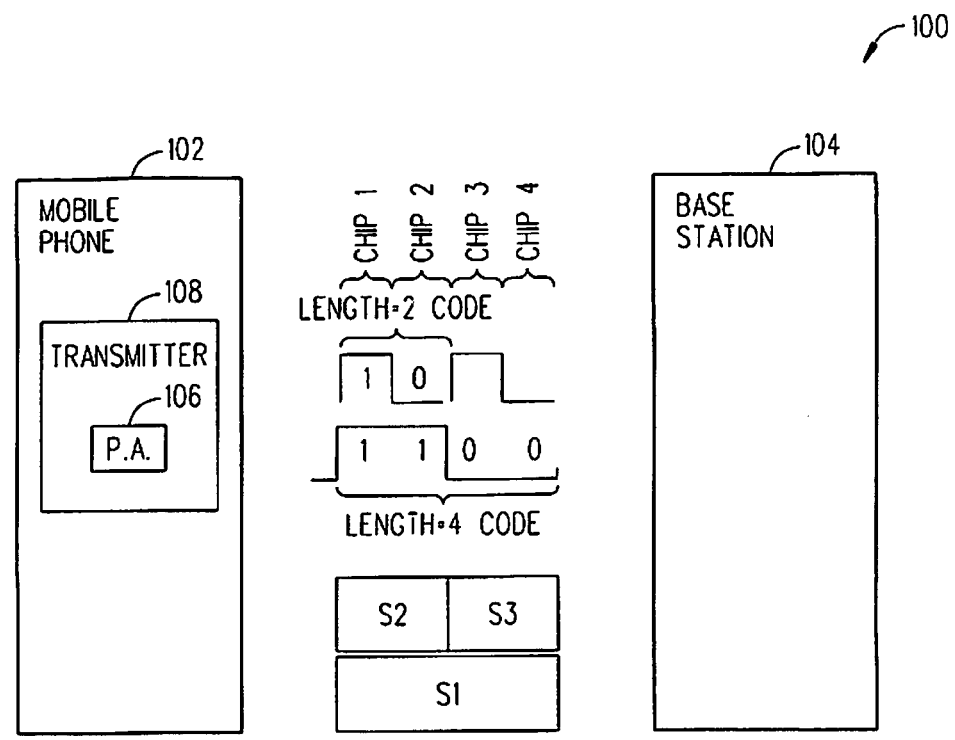
FIG. 1 is a diagram of a traditional HSPA 4+(2,2) multicode cellular system which is used to help explain the present invention.

Referring to FIG. 1, there is a block diagram of a traditional HSPA three-code multicode cellular system 100 where a mobile phone 102 has a transmitter 108 that transmits a radio signal with three 16QAM symbols S1, S2 and S3 per each 4-chip modulation period to a base station 104. As shown, a length=2 code is repeated twice and used to carry two 16QAM symbols S2 and S2 successively, while a length=4 code, orthogonal to the length=2 code is additively superimposed and used to carry a third 16QAM symbol S1 during the same 4-chip period. A 16QAM symbol constellation has the general form shown in FIG. 2. Each 16QAM symbol S1, S2 and S3 carries 4 bits so with three symbols S1, S2 and S3 there are 12 bits conveyed in the 4-chip time interval, representing $2^2$=4096 possibilities. Thus, the decoding at the base station 104 can include testing all 4096 possibilities (the "brute force" method") or may use the reduced complexity method disclosed in co-assigned U.S. patent application Ser. No. 12/035,970 filed Feb. 22, 2008 and entitled "Efficient Multicode Detection", the contents of which are incorporated by reference herein.

Figure 2:
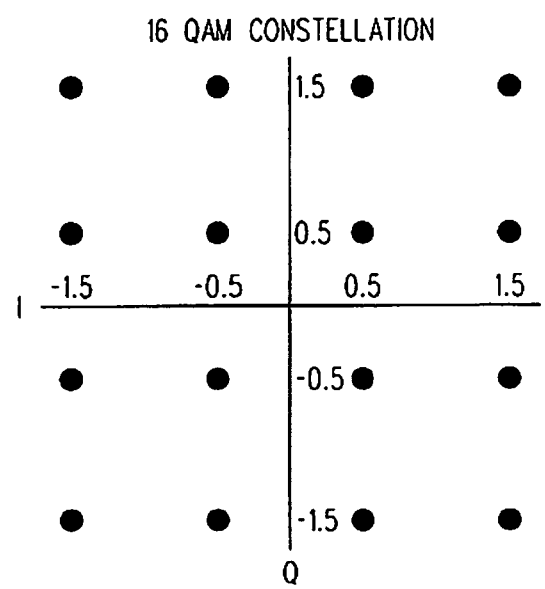
FIG. 2 is a diagram of showing the 16 points of a 16QAM constellation which is used to help explain the present invention.

Communicating using 16QAM symbols comprises transmitting 2 bits on each of the I and Q components of a signal, the bits being equispaced about zero in each of the two dimensions of the complex signal plane. Thus, the I-component may take on values of +1.5, +0.5, −0.5 and −1.5 while the Q-component does likewise independently. FIG. 2 shows the 16 possible signal points which are located in the I, Q plane at the intersections of a regular, rectangular grid. The peak-to-rms ratio of a single 16QAM symbol may be calculated by determining the peak amplitude and the root-mean-square value. The peak amplitude occurs when both I and Q take on their maximum amplitude of +/−1.5 at the same time, giving a net vector length of $1.5\sqrt{2}$, whereas the root-mean-square value is calculated by averaging the square of the amplitude over all 16 points, wherein there are 4 corner points, each with a square amplitude value $(1.5\sqrt{2})^2$=4.5; 8 points on the sides each of square amplitude $(1.5^2+0.5^2)$=2.5, and four points in the middle of square amplitude $(0.5\sqrt{2})^2$=0.5. The average of these points is (4×4.5+8×2.5+4×0.5)/16=2.5. Thus the rms value is $\sqrt{2.5}$ or 1.58. The peak-to-rms amplitude ratio is thus $1.5\sqrt{2}/\sqrt{2.5}$, which in decibels is 2.55 dB.

For the modulation of FIG. 1 however, it can be seen that two I values and two Q values are going to overlap in each chip period. The I-value of the length=4 code may be one of the four values 1.5, 0.5, −0.5, −1.5, but the I-values of the length=2 code are $\sqrt{2}$ times larger. The Q-values are scaled likewise. Thus, applying the same procedure as above to calculate peak-to-rms ratio gives the answer 5.44 dB for this type of multi-code modulation as mentioned in the background section. If, on the other hand, the three length=4 codes of the traditional 4+4+4 configuration shown in FIG. 3 had been used, then the I-values for each would have been any of the values 1.5, 0.5, −0.5 or 1.5, giving a peak I-value of 4.5 and a peak Q-value likewise, or a peak amplitude of I and Q combined of $4.5\sqrt{2}$. The rms value however is just $\sqrt{3}$ times the rms value of a single 16QAM transmission which was calculated above to be $\sqrt{2.5}$. Thus, the peak-to-rms ratio of three length=4 codes superimposed is thus $4.5\sqrt{2}/(\sqrt{3}\times\sqrt{2.5})$=2.32 or 7.32 dB, as also mentioned in the background section. Therefore, when peak amplitude is limited, the 4+(2,2) configuration of FIG. 1 is preferable to the 4+4+4 code configuration of FIG. 3.

The mobile phone's transmitter 108 also has a power amplifier 106 that generates a mean power output without distortion that depends on the peak-to-rms ratio of the signal in addition to other factors. For a class-B power amplifier 106, the maximum non-distorting efficiency occurs when it happens to be generating maximum power where the maximum efficiency is defined as follows:

$$n_{max} = \frac{\text{Peak power output}}{\text{Maximum DC power consumption}} \quad (1a)$$

and when normalized to unity load resistance the maximum efficiency can be defined as follows:

$$n_{max} = \frac{(\text{Peak amplitude})^2}{\text{Maximum DC power consumption}} \quad (1b)$$

On the other hand, the mean efficiency with a varying amplitude signal is defined as follows:

$$n = \frac{\text{Mean power output}}{\text{Mean DC power consumption}} \quad (2a)$$

$$= \frac{(\text{r.m.s. amplitude})^2}{\text{Mean DC power consumption}} \quad (2b)$$

$$= \frac{(\text{Peak amplitude}/\text{Peak-to-rms ratio})^2}{\text{Mean DC power consumption}} \quad (2c)$$

Also, the power consumption of a class-B power amplifier 106 with zero quiescent bias happens to be proportional to the output signal amplitude. Therefore, the mean DC power consumption is equal to the peak power consumption times the ratio of mean amplitude to peak amplitude, which, normalized to unity load resistance, gives the following:

$$\text{Mean DC pwr. consumption} = \quad (3a)$$

$$\frac{\text{mean amplitude} \times (\text{peak amplitude})^2}{\text{peak amplitude}}$$

$$= \text{peak amplitude} \times \text{mean amplitude} \quad (3b)$$

Combining the equations 1b, 2c and 3b results in the following:

$$\eta = \eta_{max}/(\text{peak-to-rms ratio} \times \text{mean-to-rms ratio}) \quad (4)$$

While $\eta_{max}$ is a power amplifier implementation-dependent quantity, the value peak-to-rms amplitude ratio×mean-to-rms amplitude ratio is a characteristic of the modulation. For maximum power amplifier efficiency, therefore, one would like to minimize the latter quantity. Another modulation performance measure is the ease or difficulty with which two different symbols may be confused by the base station 104. This modulation performance measure is determined by the minimum distance $d_{min}$, which is the Euclidean distance in signal space between the two symbols that are closest together. Generally, if a single pair of symbols lay closer to one another in signal space than any other pair, then they would be separated in an attempt to obtain a more equal spacing with a larger $d_{min}$. To compare different modulations in this respect, $d_{min}$ should be normalized to the same rms signal value, that is to the same mean transmitted power. Thus, the quantity $d_{min}$/(rms amplitude) is a measure of communications efficiency while $\eta$ is a measure of the transmitter's power amplifier 106 efficiency. When maximizing the latter, it is desirable that the former should preferably be maintained, and not significantly degraded. This is accomplished by the present invention.

Figure 4:
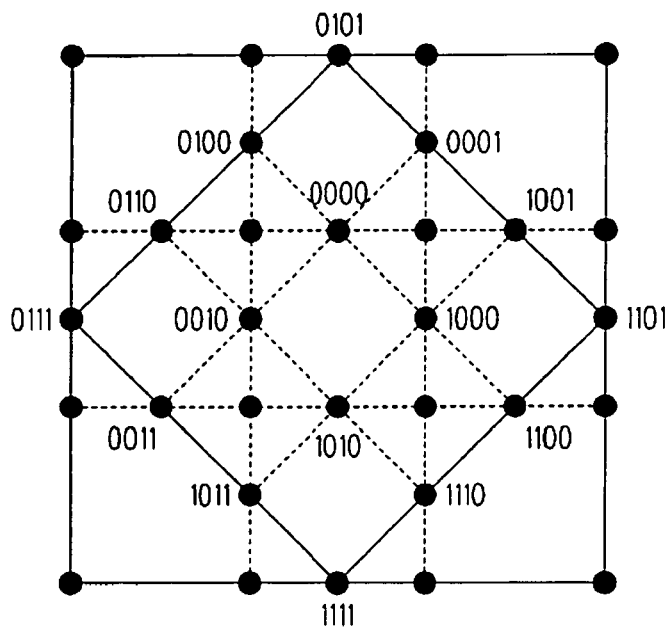
FIG. 4 is a diagram that visually depicts the 45 degree phase rotation of 16QAM symbols modulated on to a length=4 code relative to 16QAM symbols modulated on to a length=2 code of double the power ($\sqrt{2}$ times the amplitude) which is used to help explain the present invention.

Referring again to the HSPA triple-16QAM modulation shown in FIG. 1, one way to obtain a slight (0.5 dB) reduction in peak-to-rms amplitude ratio without altering the communications efficiency is to rotate the 16QAM constellation on the length=4 code by 45 degrees relative to that on the length=2 code, as shown in FIG. 4. This particular rotation scheme was disclosed in the above-mentioned U.S. patent application Ser. No. 12/166,883 that is entitled "Reduced Peak-to-RMS Ratio Multicode Signal". In the above-mentioned U.S. patent application Ser. No. 12/166,883 it was also shown that improvements in peak-to-rms ratio of different modulation method/schemes, determined before spectrally limiting filtering, tended to give the same improvement after filtering, although spectral limiting increased the peak-to-rms ratio for all of the tested modulations. In view of this, the present invention is directed to a method for achieving peak-to-rms ratio reductions which are determined before spectral limiting filtering, with the expectation that this will translate into similar peak-to-mean ratio reductions when comparing waveforms subject to spectral limiting filtering. The new method aims to avoid reducing the communications efficiency factor dmin/rms and also avoids reducing the spreading factor, so as to retain a good tolerance of multipath distortion while using transmitter equalizers of reasonable complexity. A detailed discussion is provided below about how this new method can be implemented in accordance with the different embodiments of the present invention.

Figure 3:
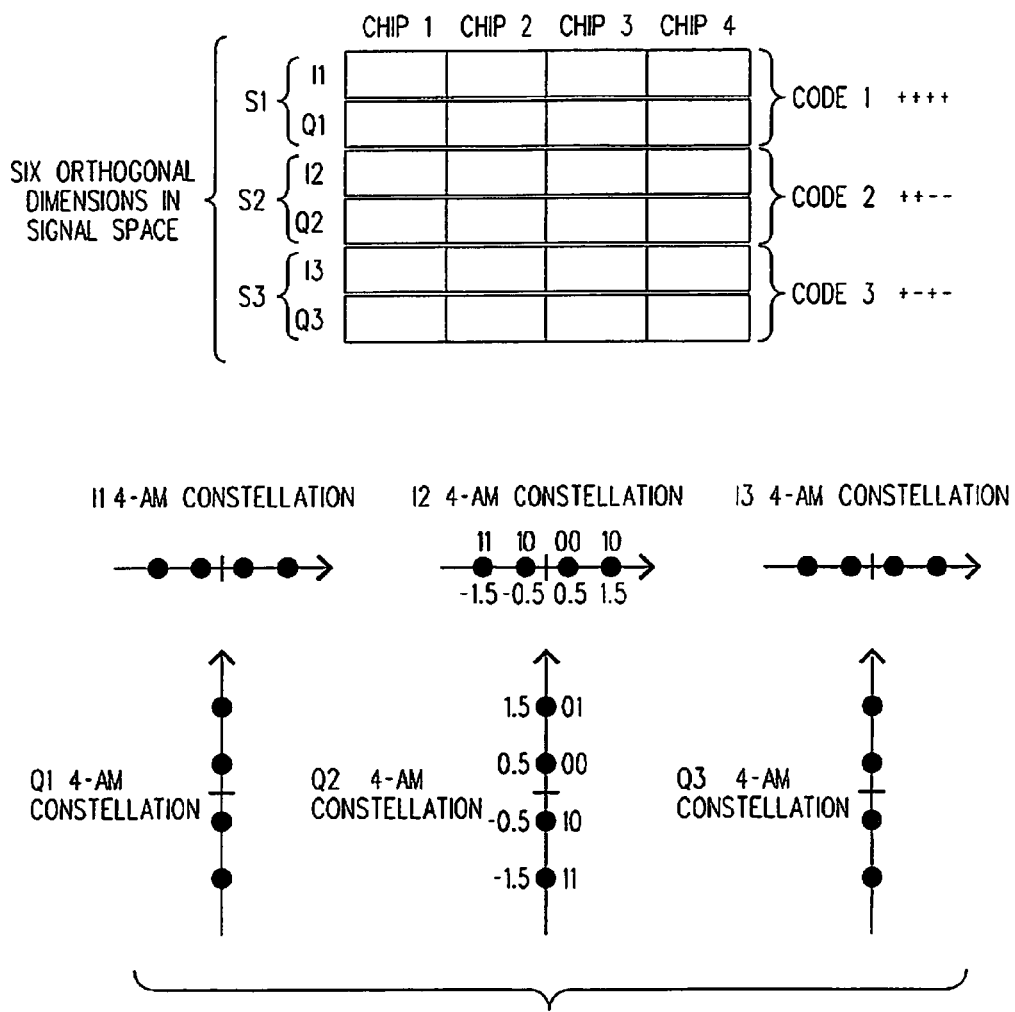
FIG. 3 illustrates diagrams associated with a traditional 4+4+4 multicode cellular system which is used to help explain the present invention.

Referring back to the three-code multicode scheme shown in FIG. 3, it can be seen that three 16QAM symbols S1, S2 and S3 can be regarded as six 4-AM symbols, each 4-AM symbol carrying two bits of information with its four possible signal points, and occupying one of six dimensions I1, Q1, I2, Q2, I3 and Q3. As shown, the pairs of (I,Q) dimensions are orthogonal by virtue of being 90 degrees out of phase, while the use of orthogonal codes allows three such pairs of I,Q values to be conveyed using all six dimensions I1, Q1, I2, Q2, I3 and Q3, which are orthogonal to each other when the codes are mutually orthogonal. Absent signal distortion in the transmission, the six dimensions I1, Q1, I2, Q2, I3 and Q3 are truly independent inasmuch as they do not interfere with one another, and also the receiver noise has a nominally equal rms value that is nominally uncorrelated between any pair of the dimensions I1, Q1, I2, Q2, I3 or Q3. However, the six dimensions I1, Q1, I2, Q2, I3 and Q3 are not independent as far as the mobile phone's transmitter 108 is concerned, as the values I1, I2, I3 and likewise the values Q1, Q2, Q3 add linearly and not quadratically. Thus the transmitted signal amplitude is as given by the following (see code 1, code 2 and code 3 in FIG. 3):

|  | Chip 1 | Chip 2 | Chip 3 | Chip 4 |
|---|---|---|---|---|
| $I_{transmit} =$ | I1 + I2 + I3 | I1 + I2 − I3 | I1 − I2 + I3 | I1 − I2 − I3 |
| $Q_{transmit} =$ | Q1 + Q2 + Q3 | Q1 + Q2 − Q3 | Q1 − Q2 + Q3 | Q1 − Q2 − Q3 | and the transmit amplitude = $(I^2_{transmit} + Q^2_{transmit})^{0.5}$

The above shows that, since all sign combinations of I1, I2 and I3 are tested across the four chips, they will be additive in some chip whatever their signs to produce the peak value in that chip. Unless otherwise constrained, the worst case is when the peak of I and the peak of Q happen to take place in the same chip.

If the I and Q signals are of the same form, then it follows that the peak-to-rms ratio of the transmit amplitude is the same as the peak-to-rms ratio of I or Q alone where the combination of I and Q merely increase both the peak and the rms by $\sqrt{2}$ alike when compared to the ratio for I or Q alone. Therefore, seeking a modulation scheme with a low peak-to-rms ratio on I and Q alone can produce a low peak-to-rms for the combined transmit signal. Thus, it is desirable that none of I1+I2+I3, I1+I2−I3, I1−I2+I3 and I1−I2−I3 exceed some desired peak value, which can be arbitrarily chosen to be 1.0.

These four constraints can be expressed by |I1|+|I2|+|I3|< or =1 with the boundary being set to 1.

Figure 5:
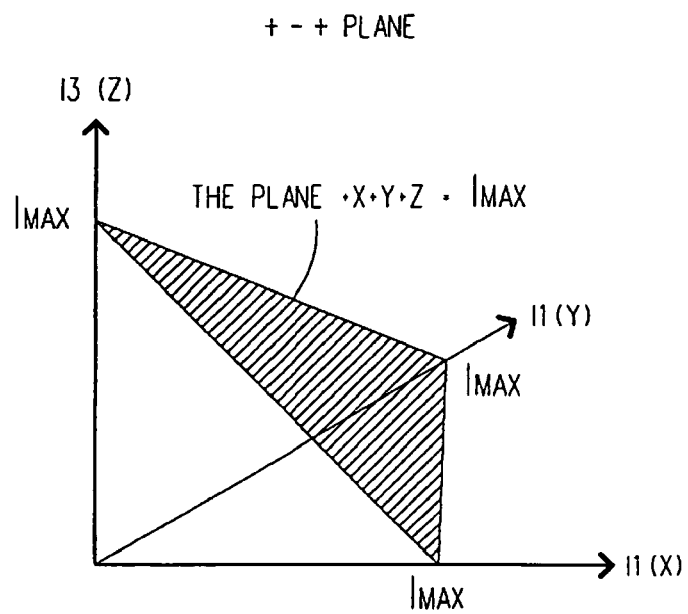
FIG. 5 is a graph that depicts a +++ plane for I1, I2, I3 when +I1+I2+I3=1 which is used to help explain the present invention.

This boundary comprises 8 planes, corresponding to each of the two possible signs + or − which each of the three values I1, I2 and I3 could have. For example, the +++ plane for I1, I2, I3 when they are all positive is given by +I1+I2+I3=1 and is shown in FIG. 5. In FIG. 5, the transition from I1, I2, I3 notation to the conventional 3-D coordinates X, Y, Z has also been introduced.

Figure 6:
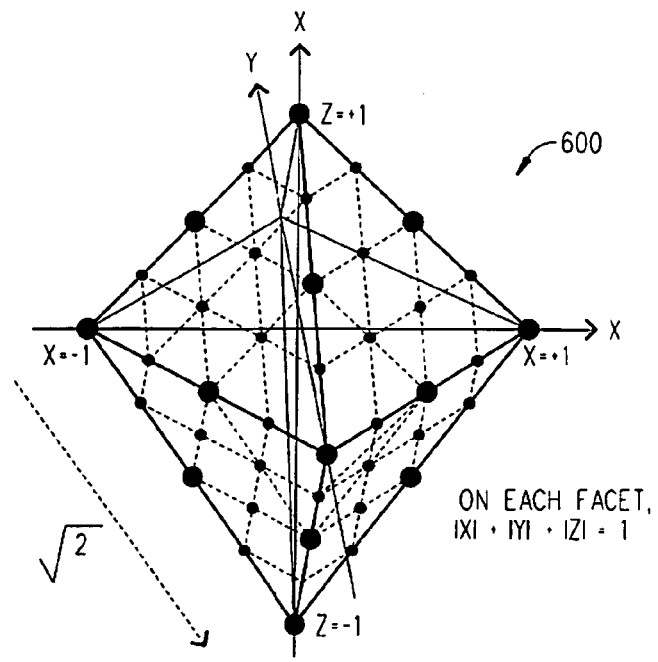
FIG. 6 is a diagram that depicts a diamond-shaped constellation which is used to help explain the present invention.

When the 8 planes corresponding to all 8 sign combinations are drawn, the result is a diamond shape 600 which is shown in FIG. 6. In order to represent the three pairs of bits carried by the three signals I1, I2 and I3 belonging to the original three 16QAM symbols, a total of 64 possible points needs to be located on or within the diamond shape 600. An example of a regular spacing yielding a total of 66 points has been shown in the diamond shape 600 where two points may therefore be omitted. The 66 points include:

- 6 vertices where one coordinate is +/−1 and the other two coordinates are zero (total of 6 points).
- 12 edges where one coordinate is zero and the other two are + or −. The edge center points have non-zero coordinates +/−0.5 while the other two points on each edge have non-zero coordinates (+/−0.25, +/−0.75) or vice versa giving a total of 36 points.
- 8 facets corresponding to the planes |X|+|Y|+|Z|=1, each triangular facet having a triangle of three points in its center. The coordinates of these points have coordinates 0.5, 0.25, 0.25 (the sum of which is unity) permuted in every way between X, Y and Z and with all possible +/−signs for a total of 24 points.

The minimum distance $d_{min}$ of this constellation is $0.25\sqrt{2}=0.3535$.

The rms value for this particular constellation may be calculated in the same way as was carried out above with the 16QAM constellation (see FIG. 3). However, to be able to compare this performance with the 16QAM performance, the six dimensions of FIG. 6 first need to be grouped to form two three-dimensional symbols comparable to the two 3-dimensional symbols 702 and 704 that are shown in FIG. 7.

Figure 7:
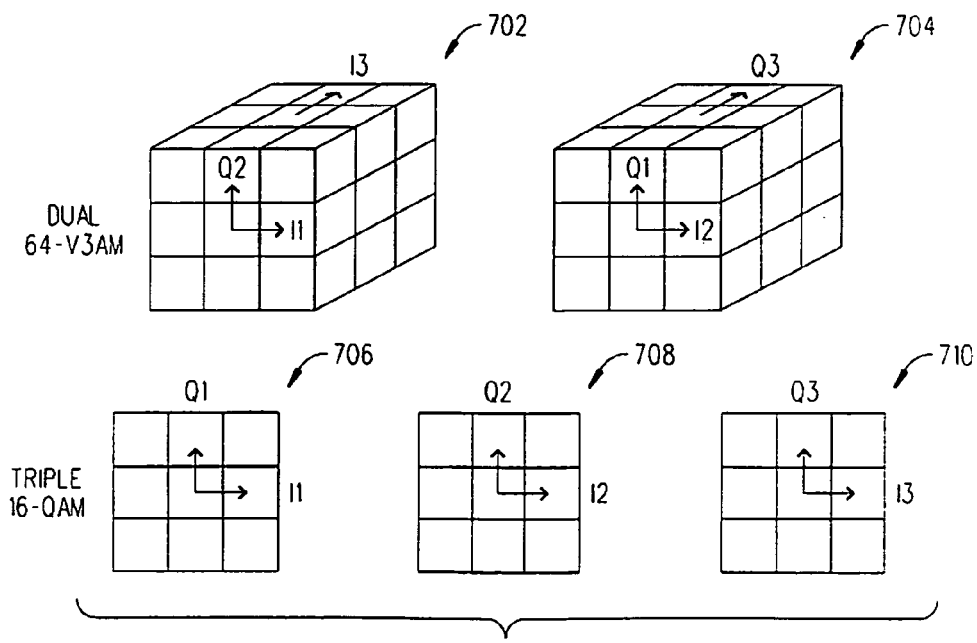
FIG. 7 are diagrams illustrating different ways six dimensions I1, Q1, I2, Q2, I3 and Q3 can be grouped to form multi-dimensional symbols which are used to help explain the present invention.

FIG. 7 suggests that the six dimensions I1, Q1, I2, Q2, I3 and Q3 can be conceptually grouped in any desired way, for example, as six 4-AM symbols (FIG. 3), as three 16QAM symbols 706, 708 and 710, or as the aforementioned two 3-D symbols 702 and 704 for which the nomenclature V3AM is used, to mean Amplitude Modulation along each axis of a 3-dimensional space (a V3). In principle, the six dimensions I1, Q1, I2, Q2, I3 and Q3 could alternatively be grouped as one V4AM symbol and one QAM symbol. Thus, when the number of points along each of three axes is 4, then the total number of points in a 3-D symbol is $4^3$=64, so the notation 64-V3AM can be used. Likewise, four points along each dimension of a V4 would produce a 256-V4AM, and five points along each dimension of a V5 could produce a 1024-V5AM, and six points along each dimension of a V6 could produce a 4096-V6AM.

The following TABLE #1 compares the properties of the 64-V3AM constellation (I1, I2, I3) with the diamond constellation 600 of FIG. 6, where two points have been omitted.

TABLE #1

|  | 64-V3AM | Diamond Const. |
|---|---|---|
| Peak-to-rms ratio | 7.32 dB | 2.75 dB |
| $d_{min}$-to-rms ratio | −8.75 dB | −9.29 dB |
| PA efficiency loss | −3.21 dB | −1.12 dB |

It can be seen that the diamond constellation 600 achieves the desirable reduction of 4.57 dB in the peak-to-rms ratio and a 2 dB improvement in the power amplifier (PA) efficiency at the expense of a small reduction of 0.44 dB in the minimum distance. The latter can, however, be mitigated by depressing the vertices of the diamond from a non-zero coordinate of 1.0 to a non-zero coordinate of +/−0.25 (for example) with the following results:

TABLE #2

|  | 64-V3AM | Diamond Const. |
| --- | --- | --- |
| Peak-to-rms ratio | 7.32 dB | 3.53 dB |
| $d_{min}$-to-rms ratio | −8.75 dB | −8.51 dB |
| PA efficiency loss | −3.21 dB | −1.43 dB |

Figure 8:
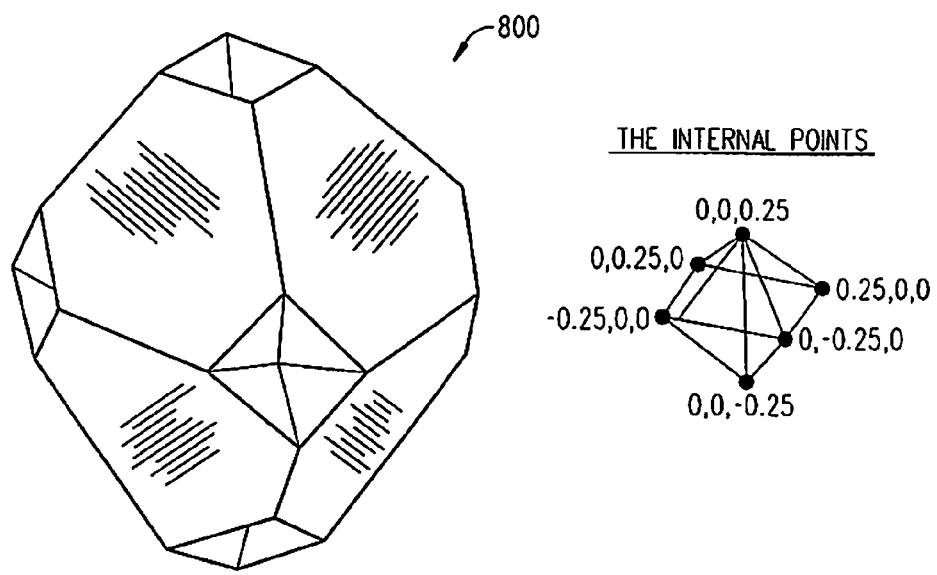
FIG. 8 is a diagram that depicts a diamond-shaped constellation which has depressed vertices that is used to help explain the present invention.

By depressing the vertices, the rms value is reduced, which improves the $d_{min}$, however the peak remains the same, so the peak to rms-ratio is only slightly higher. This is a more desirable result, as the mean transmitter power consumption for the same symbol error rate will be lower. The shape of a 3-dimensional constellation 800 which has depressed vertices is shown in FIG. 8. Other modifications to the diamond constellation 600 as well as other diamond constellations which are within the same family are discussed in detail below after discussing one embodiment of the mobile phone's transmitter in accordance with the present invention.

Figure 9:
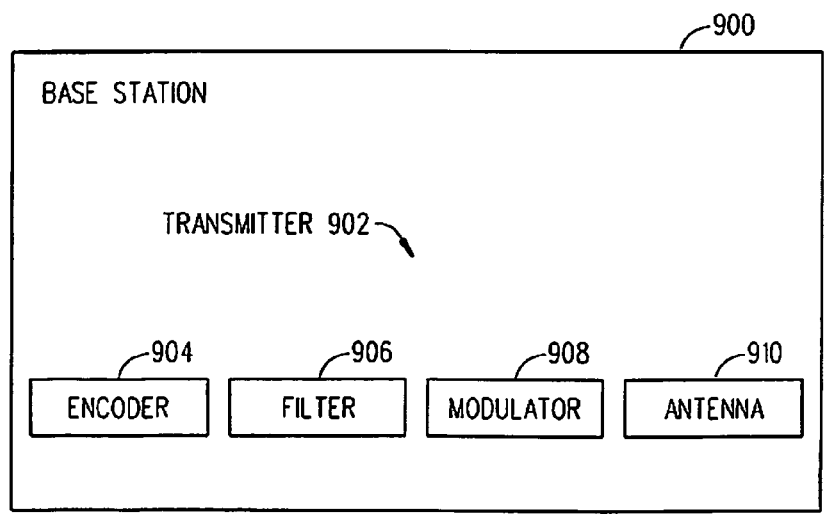
FIG. 9 is a block diagram of a mobile phone with a transmitter that is configured in accordance with an embodiment of the present invention.

Referring to FIG. 9, there is shown a mobile phone 900 with a transmitter 902 that reduces the peak-to-rms ratio in a radio signal while placing a limit on the peak composite symbol amplitude when utilizing multi-dimensional modulation in accordance with one embodiment of the present invention (note: only the transmitter's components-functions that are relevant to the present invention have been described herein). Basically, the transmitter 902 (e.g., multicode transmitter 902) can realize the reduced peak-to-rms amplitude ratio with a limited peak composite symbol amplitude using:

(i) An encoder 904 that divides groups of data bits, e.g. 12 bits, into a first subgroup (e.g., 6 bits) and a second subgroup (e.g., 6 bits).

(ii) The encoder 904 takes the first subgroup of bits and selects one of a number of constellation points that are distributed within a first multi-dimensional space (e.g. the 3-dimensional space X, Y, Z), where the location of the constellation points have been determined such that the sum of their coordinates is less than a desired maximum value. The coordinates of the selected constellation point are then used to set the values of the real parts of corresponding complex numbers, the real part of each complex number thus corresponding to the value of an associated coordinate.

(iii) The encoder 904 takes the second subgroup of bits and selects another one of a number of constellation points that are distributed within a second multidimensional space (e.g. the 3-dimensional space X, Y, Z), where the location of the constellation points have been determined such that the sum of their coordinates is less than a desired maximum value. The coordinates of the selected constellation point are then used to set the values of the imaginary parts of corresponding complex numbers, the imaginary part of each complex number thus corresponding to the value of an associated coordinate.

(iv) The encoder 904 pairs one real and one imaginary part to form a complex number and the remaining real and imaginary parts are paired likewise to obtain a set of complex numbers. If one multidimensional space has more dimensions than the other, then one or more real or imaginary part may not be paired, resulting in one or more non-complex numbers which are either purely real or purely imaginary.

(v) The encoder 904 assigns the numbers obtained above to be multiplied by an associated one of a number of multi-chip orthogonal codes. The products of each number with its code are then added chip-wise to obtain a multi-code symbol comprising a sequence of in general complex-valued chips.

(vi) A filter 906 (e.g., root-Nyquist filter 906) receives a stream of the multicode symbols and filters them to constrain the transmitted spectrum.

(vii) A modulator 908 which modulates the filtered signal with a radio frequency carrier.

(viii) An antenna 910 which transmits the modulated radio signal.

It is considered desirable to associate bit groups with constellation points in steps (ii) and (iii) such that neighboring constellation points differ in as few bit positions as possible, preferably only one. This so-called Grey coding works well for 4-AM, 16QAM, 64V3-AM etc . . . since in each dimension the bit pairs are distributed in the order 00, 01, 11, such that moving along any one dimension, the successively encountered bit patterns differ by only one bit. There are other situations where the opposite may be desired, for example, when performing Trellis Coding along symbols, so Grey coding is not always the desired choice. For example, if the 66-point diamond constellation 600 or 800 were assigned to transmit the letters, numbers and other characters of a language, as in the ASCII code, then the optimum assignment would have nothing to do with bit patterns but something to do with the severity of an inadvertent character substitution on the legibility of a plain-text message. An optimum assignment might then be such that an error would tend to replace one vowel with a similar vowel (e.g., e, i, y) one consonant with a similar consonant (e.g., t, d or p, b) one punctuation mark with a similar punctuation mark (e.g., space, -, /) and so forth. Another scheme which is different than the Grey coding scheme that may be chosen involves the use of the 6-bit symbol to carry a 6-bit PCM speech word. In this case, the bitcodes would be allocated by spiraling down the constellation from top to bottom in order of numerical value of the 6-bit PCM word, so that words far apart in value are also far apart in the constellation. Grey coding is desirable however when the purpose of the modulation is to convey arbitrary binary bit streams such as encrypted speech or data with a minimum bit error rate.

Figure 10:
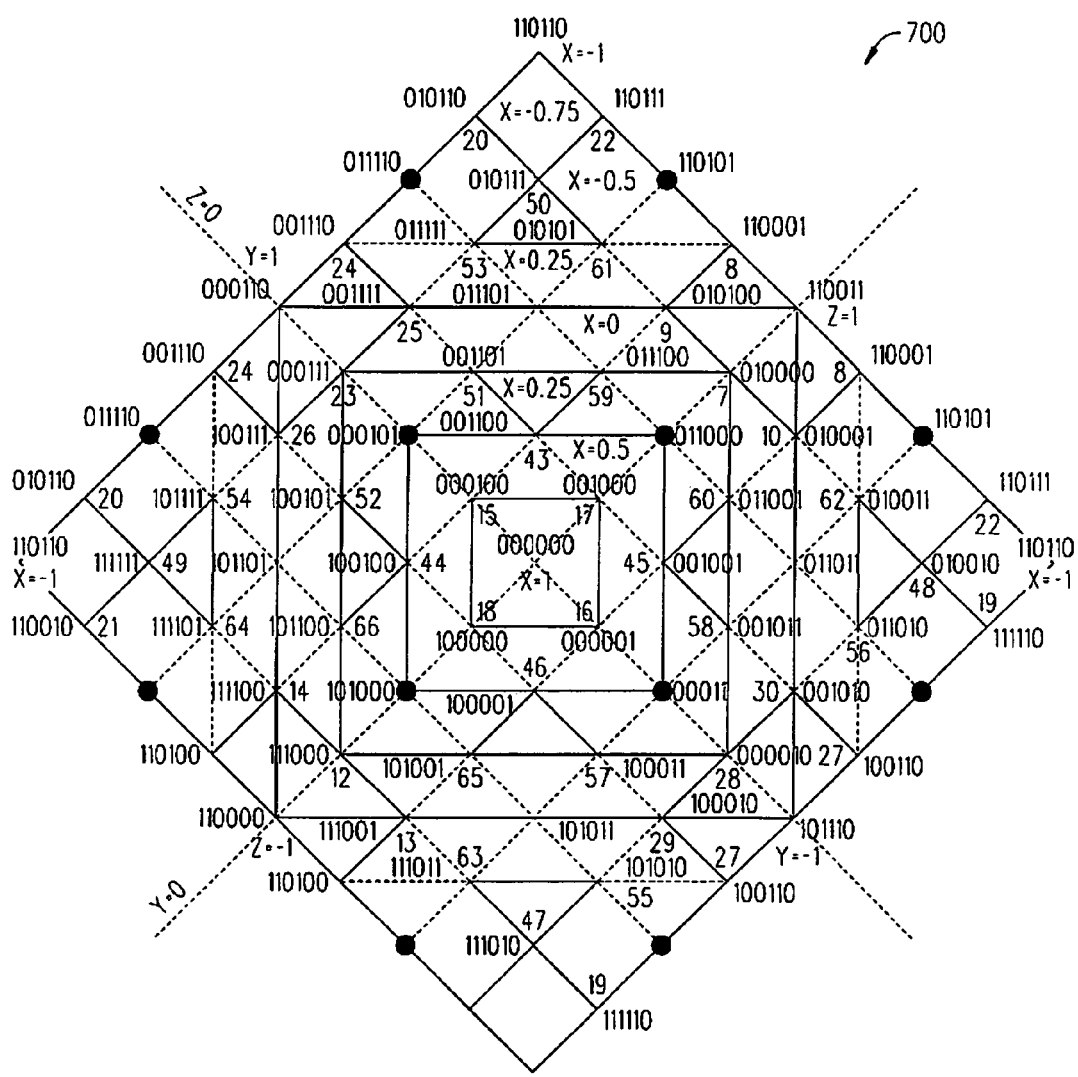
FIG. 10 is a diagram illustrating a Grey-code assignment of 6-bit groups to the diamond constellation shown in FIG. 8 which is used to help explain the present invention.

Perfect Grey coding is not always possible, but an example of an attempt at a Grey-code assignment of 6-bit groups to the diamond constellation 800 is shown in FIG. 10. FIG. 10 is looking down on the diamond constellation 800 with one vertex (X=1), which is assigned the code 000000, in the middle and the projection of the four triangular facets having the center point (code 000000) as a common vertex are visible. The four facets on the back side away from the viewer have been folded out and their projections form an outer square, the corners of which are all the same point, which is assigned the code 110110, and is the antipodal vertex to the vertex 000000 in the center of the diagram. Due to unfolding of the back-side facets, some edges (e.g. the line comprising codes 000110, 001110, 011110, 010110, 110110) are thus repeated twice, mirror-imaged along the sides of the outer square.

In this example, the six-bit groups are considered as 3+3 bit groups, and each subgroup of 3 bits may be incremented in Grey-code order along one set of lines and the other 3-bit group incremented in Grey-code order along the set of lines at right angles to the first set. This would achieve perfect Grey-coding if the diamond constellation 800 was an 8×8 rectangular grid, but due to the mirror-imaging of sides of the unfolded facets, as described above, some non-Grey clashes occur at the edges.

For example, although edge-code 011110 differs by only one bit from adjacent code 011101 at point 53, it differs by three bits from code 101111 at point 54. This is because, when the back-side facets are folded into their proper positions, code 011110 is adjacent to both points 53 and 54, and cannot be only 1-bit different from both of their assigned codes. As long as these are a small fraction of the total number of pairs of neighboring points, however, the effect on mean Hamming distance is small.

Figure 11:
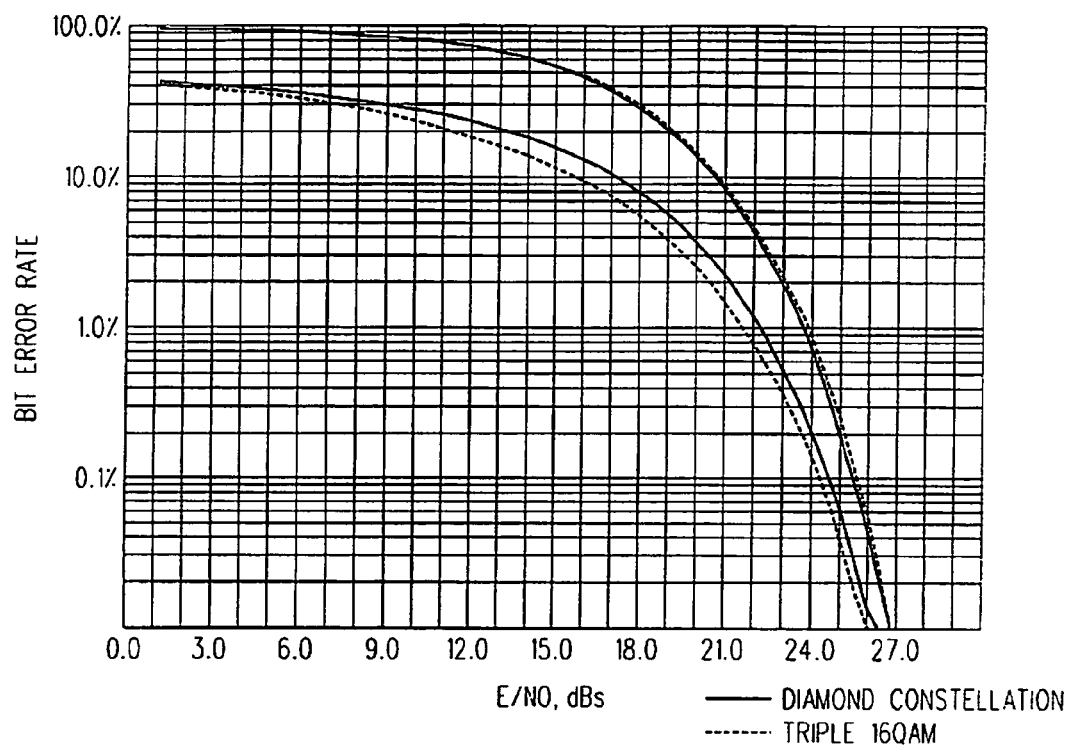
FIG. 11 is a graph illustrating an error rate versus a total transmitted signal power to noise ratio which is used to help explain the present invention.

The tentative Grey-code bit allocation that was carried out as described above has been illustrated in FIG. 10. This particular bit-code to symbol allocation has been used to compute the bit error rate from the symbol error rate when transmitting and receiving data in noise (see FIG. 11). As shown in FIG. 11, the curves of symbol error rate and bit error rate for the dimpled diamond constellation 800 of FIG. 8 and the bit-code allocation of FIG. 10 are compared to that of 64-V3AM, which had the same performance as triple 16QAM using either the aforementioned 4+4+4 or 4+(2,2) configurations with the same total transmitted power. In FIG. 11, the error rate is plotted versus the total transmitted signal power to noise ratio. This graph illustrates that the dimpled diamond constellation 800 produces a slightly lower symbol error rate than triple 16QAM, reflecting its slightly better $d_{min}$-to-rms ratio, while having a slightly higher bit error rate due to the average number of bit errors per symbol error being about 1.5 times greater for each nearest-neighbor error event. However, this approximately 0.4 dB loss is more than compensated by the ability to run the transmit power amplifier with 0.9 db greater efficiency than the triple 16QAM of the 4+(2,2) constellation. The constellation coordinates and the numerical value of their pseudo-Grey bit-code assignments are given below in TABLE #3.

TABLE #3

| Point | Code | X | Y | Z |
|---|---|---|---|---|
| 1 | 0 | 0.25 | 0.00 | 0.00 |
| 2 | 6 | 0.00 | 0.25 | 0.00 |
| 3 | 51 | 0.00 | 0.00 | 0.25 |
| 4 | 54 | −0.25 | 0.00 | 0.00 |
| 5 | 46 | 0.00 | −0.25 | 0.00 |
| 6 | 48 | 0.00 | 0.00 | −0.25 |
| 7 | 16 | 0.25 | 0.00 | 0.75 |
| 8 | 49 | −0.25 | 0.00 | 0.75 |
| 9 | 20 | 0.00 | 0.25 | 0.75 |
| 10 | 17 | 0.00 | −0.25 | 0.75 |
| 11 | 52 | −0.25 | 0.00 | −0.75 |
| 12 | 56 | 0.25 | 0.00 | −0.75 |
| 13 | 57 | 0.00 | −0.25 | −0.75 |
| 14 | 60 | 0.00 | 0.25 | −0.75 |
| 15 | 4 | 0.75 | 0.25 | 0.00 |
| 16 | 1 | 0.75 | −0.25 | 0.00 |
| 17 | 8 | 0.75 | 0.00 | 0.25 |
| 18 | 32 | 0.75 | 0.00 | −0.25 |
| 19 | 62 | −0.75 | −0.25 | 0.00 |
| 20 | 22 | −0.75 | 0.25 | 0.00 |
| 21 | 50 | −0.75 | 0.00 | −0.25 |
| 22 | 55 | −0.75 | 0.00 | 0.25 |
| 23 | 7 | 0.25 | 0.75 | 0.00 |
| 24 | 14 | −0.25 | 0.75 | 0.00 |
| 25 | 15 | 0.00 | 0.75 | 0.25 |
| 26 | 39 | 0.00 | 0.75 | −0.25 |
| 27 | 38 | −0.25 | −0.75 | 0.00 |
| 28 | 2 | 0.25 | −0.75 | 0.00 |
| 29 | 34 | 0.00 | −0.75 | −0.25 |
| 30 | 10 | 0.00 | −0.75 | 0.25 |
| 31 | 5 | 0.50 | 0.50 | 0.00 |
| 32 | 3 | 0.50 | −0.50 | 0.00 |

TABLE #3-continued

| Point | Code | X | Y | Z |
|---|---|---|---|---|
| 33 | 24 | 0.50 | 0.00 | 0.50 |
| 34 | 40 | 0.50 | 0.00 | −0.50 |
| 35 | 41 | 0.25 | −0.25 | −0.50 |
| 36 | 30 | −0.50 | 0.50 | 0.00 |
| 37 | 44 | 0.25 | 0.25 | −0.50 |
| 38 | 53 | −0.50 | 0.00 | 0.50 |
| 39 | 29 | 0.00 | 0.50 | 0.50 |
| 40 | 45 | 0.00 | 0.50 | −0.50 |
| 41 | 27 | 0.00 | −0.50 | 0.50 |
| 42 | 43 | 0.00 | −0.50 | −0.50 |
| 43 | 12 | 0.50 | 0.25 | 0.25 |
| 44 | 36 | 0.50 | 0.25 | −0.25 |
| 45 | 9 | 0.50 | −0.25 | 0.25 |
| 46 | 33 | 0.50 | −0.25 | −0.25 |
| 47 | 58 | −0.50 | −0.25 | −0.25 |
| 48 | 18 | −0.50 | −0.25 | 0.25 |
| 49 | 63 | −0.50 | 0.25 | −0.25 |
| 50 | 23 | −0.50 | 0.25 | 0.25 |
| 51 | 13 | 0.25 | 0.50 | 0.25 |
| 52 | 37 | 0.25 | 0.50 | −0.25 |
| 53 | 31 | −0.25 | 0.50 | 0.25 |
| 54 | 47 | −0.25 | 0.50 | −0.25 |
| 55 | 42 | −0.25 | −0.50 | −0.25 |
| 56 | 26 | −0.25 | −0.50 | 0.25 |
| 57 | 35 | 0.25 | −0.50 | −0.25 |
| 58 | 11 | 0.25 | −0.50 | 0.25 |
| 59 | 28 | 0.25 | 0.25 | 0.50 |
| 60 | 25 | 0.25 | −0.25 | 0.50 |
| 61 | 21 | −0.25 | 0.25 | 0.50 |
| 62 | 19 | −0.25 | −0.25 | 0.50 |
| 63 | 59 | −0.25 | −0.25 | −0.50 |
| 64 | 61 | −0.25 | 0.25 | −0.50 |

Figure 12:
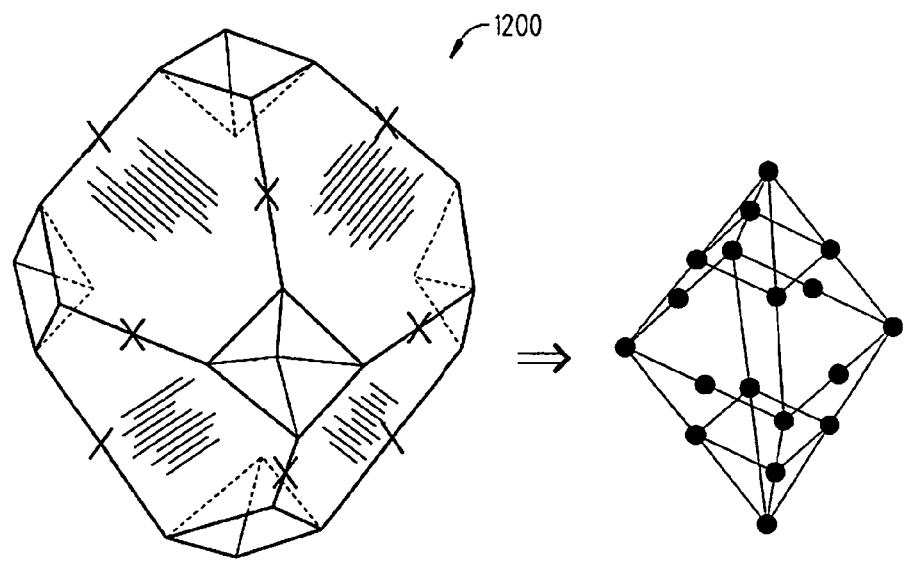
FIG. 12 is a diagram that depicts a dimpled diamond-shaped constellation which is used to help explain the present invention.

If desired, the diamond constellation 600 may be dimpled differently by insetting not only the six vertices, but also the 12 edge-centers. The inset points form an internal diamond constellation of order 2, as further described below, while 48 points remain on the surface of the larger dimpled diamond constellation 1200 which is shown in FIG. 12 (note: a + marks the edge centers that have been inset). For transmitting 6 bits per symbol, any two points may be omitted, for example two of the 48 points, in the interests of minimizing average transmitted power for the same $d_{min}$. A more detailed discussion about diamond constellations is provided below after a detailed discussion about how a receiver decodes the radio signal in accordance with several different embodiments of the present invention.

Figure 13:
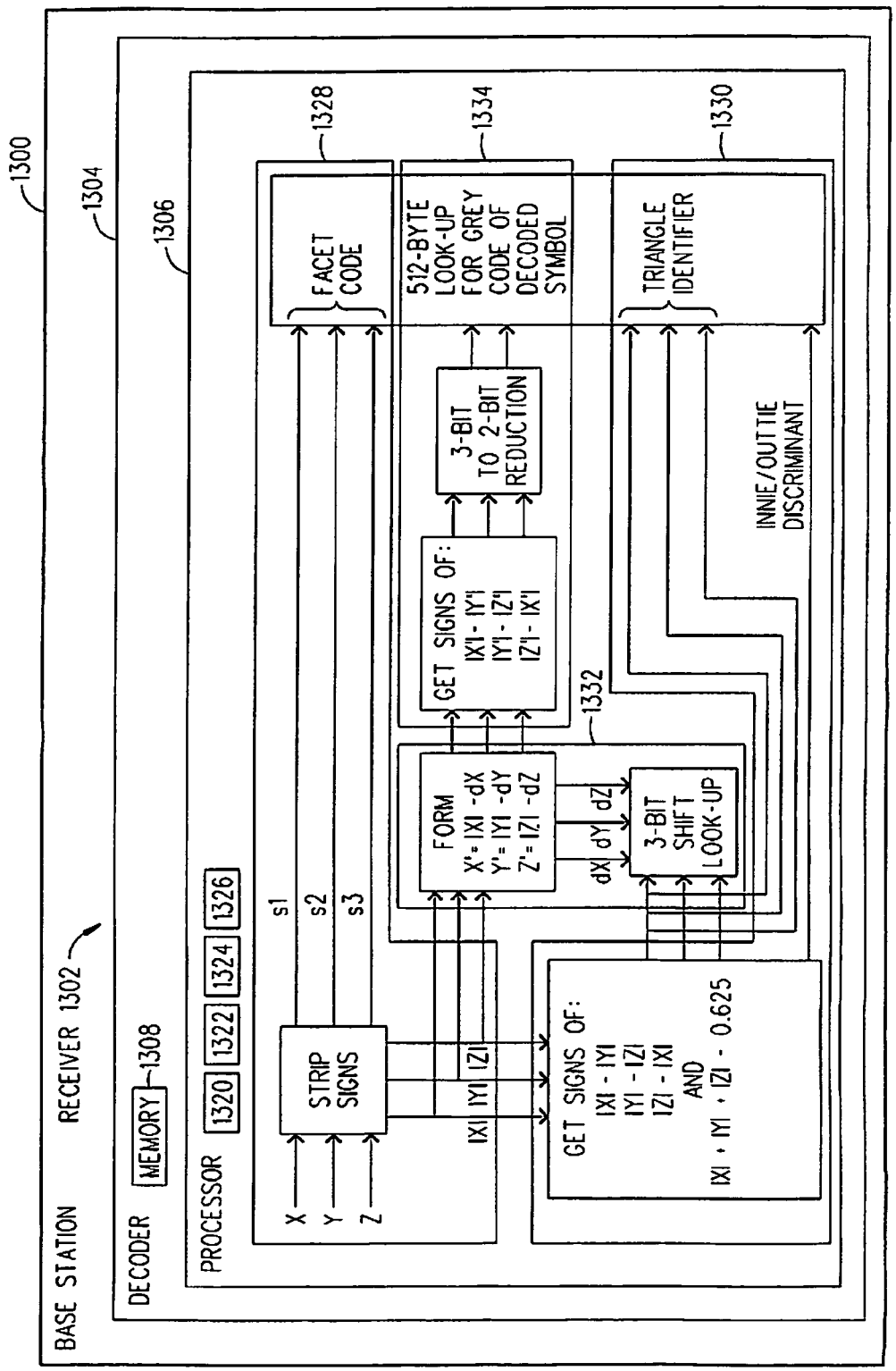
FIG. 13 is a block diagram of a base station with a receiver that is configured in accordance with an embodiment of the present invention.

Referring to FIG. 13, there is shown a base station 1300 with a receiver 1302 that decodes the radio signal in accordance with one embodiment of the present invention (note: only the receiver's components-functions that are relevant to the present invention have been described herein). If desired, the receiver 1302 can employ a decoder 1304 (having a processor 1306 which implements processor-executable instructions from a memory 1308) that is similar to the decoder described in the aforementioned U.S. patent application Ser. No. 12/035,970 except that the decoder 1304 is adapted to decode a diamond constellation as is described below in more detail with respect to FIGS. 14-16.

In one embodiment, the receiver 1302 receives the radio signal and mitigates the effects of multi-path propagation between itself and the transmitter 902 by subtracting the influence of previously decoded symbols using a decision feedback technique together with an equalizer feedforward technique to mitigate the Intersymbol Interference caused by as-yet undecoded symbols in the radio signal (steps 1320 and 1322). As a result, the remaining radio signal depends on the two diamond-constellation symbols that are encoded into the real and imaginary parts, with noise and other potential impairments. Then, the equalized signal is decoded by first hypothesizing one of the two diamond symbols, looking up its X, Y, Z coordinates, and subtracting its influence from the signal samples (step 1324). The modified signal samples after subtracting the hypothesized symbol then comprise a number of complex values that depend linearly on the X, Y, Z coordinates of the second symbol. Splitting the real and imaginary parts into separate equations yields substantially more equations than the three unknowns X, Y and Z, and the equations may therefore be solved in the least squares sense to obtain the values of X, Y and Z that best explain all of the modified signal values (step 1326). The resultant solution for the X, Y and Z coordinates are quantized to the nearest symbol in the constellation, which can be rapidly carried out according to the following technique:

1. Form the modulus of X, Y and Z which is |X|, |Y|, |Z| and save the signs Sx, Sy, Sz. The signs determine on which of the 8 facets the symbol lies, while |X|, |Y|, |Z| identifies the point on the facet, as if it were the +++facet (step 1328).

Figure 14:
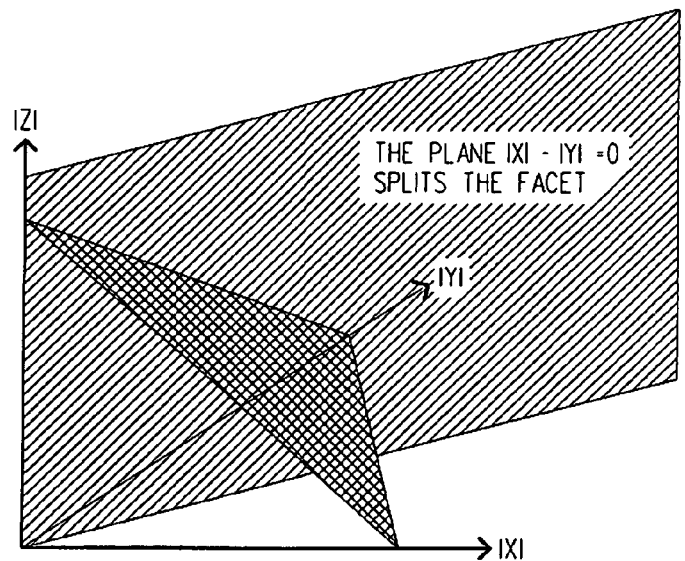
FIGS. 14-16 are diagrams which are used to help explain how the receiver shown in FIG. 13 decodes a radio signal in accordance with one embodiment of the present invention.
Figure 15:
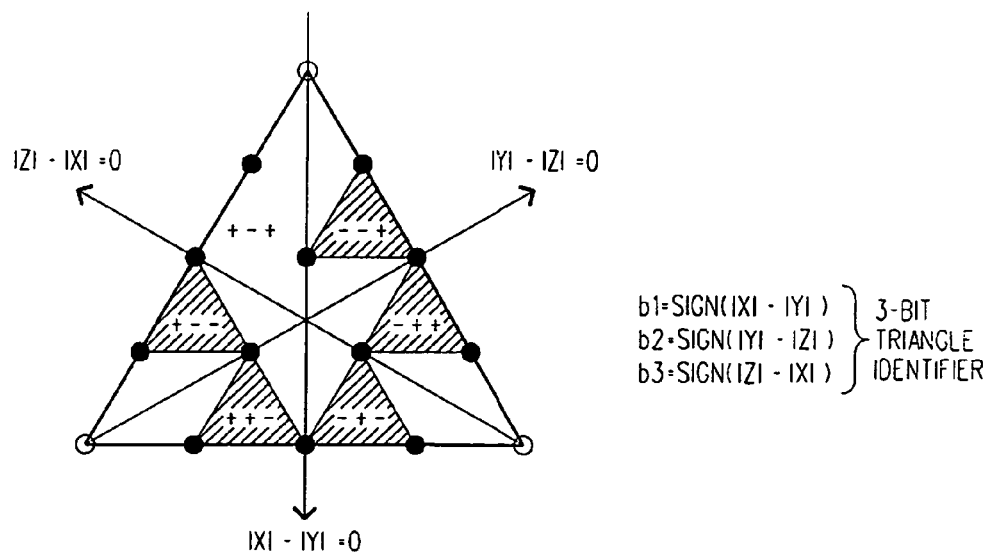

2. FIG. 14 illustrates that the plane |X|−|Y|⊕=0 splits the facet from one vertex through the center of the opposite side while the planes |Y|−|Z|=0 and |Z|−|X|=0 split the facet likewise through corresponding vertices. Thus, the signs of |X|−|Y|, |Y|−|Z| and |Z|−|X| narrow the decoding down to one of six triangles of three points on the facet, as shown in FIG. 15 (step 1330).

3. In dependence on the triangle determined in step 2, a shift dX, dY, dZ is applied to |X|, |Y|, |Z| to center the triangle about the middle of the facet and obtain shifted values X', Y', Z'. The shift values dX, dY, dZ are selected from a small look-up table addressed by a 3-bit triangle identifier given by the three signs determined in step 2 (step 1332).

4. Discriminating between the three points of the now-centered triangle is then achieved by looking at the signs of X'−Y', Y'−Z' and Z'−X' as shown in FIG. 16.

Figure 16:
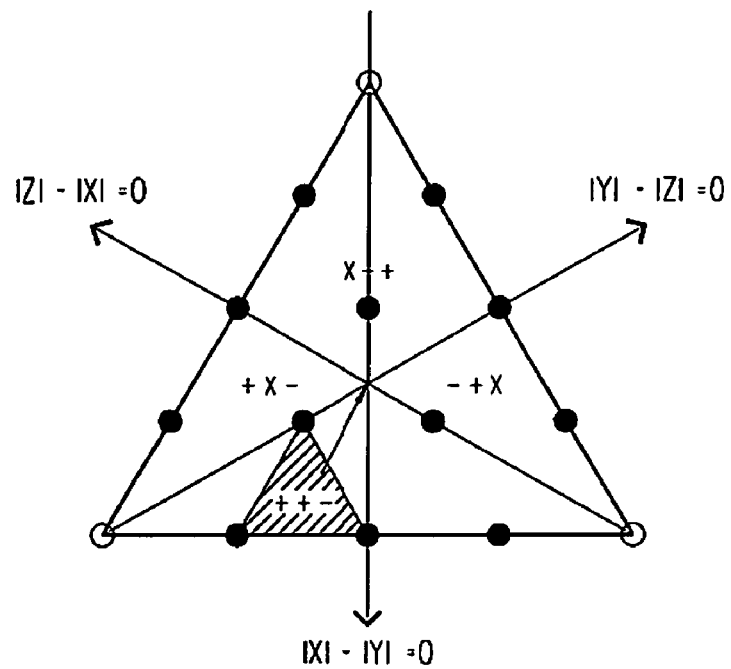

Thus the signs of X'−Y', Y'−Z' and Z'−X' identify the point as one of the three points labelled (x−+), (+x−) and (−+x) in FIG. 16, where the x means "don't care" (step 1334).

Steps 1-4 involve no multiplies and only a few subtractions. Quantizing an X, Y, Z value to the nearest of 64 constellation points is thus not significantly more difficult than for the aforementioned triple 16QAM case.

Once the second symbol has been determined as was described above, it forms together with the hypothesized symbol a candidate decoding. Thus, each hypothesis of the first symbol produces a candidate decoding, and the selection between candidate decodings occurs by comparing metrics. The metrics are obtained by using both symbols of a candidate to compute the expected signal values, and calculating the metric as the sums square error between expected and actual signal values. When the noise on different signal values is correlated, the above least squares solution and the metric calculation take this into account, for example, by weighting the equations with the square root of the inverse correlation matrix (see also the aforementioned U.S. patent application Ser. No. 12/035,970).

The number of signal samples used to decode the transmission signal depends on the multipath channel delay profile and on the results of pre-equalizing. Generally, at least as many signal samples as the length of the code should be used. Alternatively, it should be appreciated that there are even more signal samples and thus more equations which can be solved when the radio signal is received by more than one diversity antenna at the receiver. This can be desirable since the greater the over-dimensioning of the equations being solved, then the more noise immunity is likely to result.

The simplest decoding technique is by correlating four signal samples with each of the three length-4 codes to obtain three complex correlations. This results in six real equations which represents 2:1 over-dimensioning when it comes to solve for the X, Y, Z coordinates of a diamond symbol. However, when multipath propagation exists, using correlations with only the three codes may result in losing information, as a signal time shift due to a delayed multipath ray results in energy being present in the 4th code. However, correlating with all 4 codes has little utility when compared to just processing all four signal samples and solving eight real equations for X, Y and Z. In fact, multipath propagation is likely to result in information being present in more than four chips, so the number of signal samples processed can be greater than four. Moreover, when the noise is not white, or otherwise correlated from one signal sample to the next, it can be useful to process signal samples that do not depend on the X, Y, Z values sought. All this is explained as follows.

Received signal samples
$R1 = I1 + jQ1$
$R2 = I2 + jQ2$
$R3 = I3 + jQ3$
$R4 = I4 + jQ4$ (at least, and probably further samples) are related linearly to the X, Y, Z coordinates of diamond symbol 1 and diamond symbol 2 by equations such as (collectively referred to below as equation no. 5):

$$A11.X1 + A12.Y1 + A13.Z1 + A14.X2 + A15.Y2 + A16.Z2 = I1$$

$$A21.X1 + A22.Y1 + A23.Z1 + A24.X2 + A25.Y2 + A26.Z2 = Q1$$

$$A31.X1 + A32.Y1 + A33.Z1 + A34.X2 + A15.Y2 + A16.Z2 = I2$$

$$A41.X1 + A42.Y1 + A43.Z1 + A44.X2 + A45.Y2 + A46.Z2 = Q2$$

$$A51.X1 + A52.Y1 + A53.Z1 + A54.X2 + A55.Y2 + A56.Z2 = I3$$

$$A61.X1 + A62.Y1 + A63.Z1 + A64.X2 + A65.Y2 + A66.Z2 = Q3$$

$$A71.X1 + A72.Y1 + A73.Z1 + A74.X2 + A75.Y2 + A76.Z2 = I4$$

$$A81.X1 + A82.Y1 + A83.Z1 + A84.X2 + A85.Y2 + A86.Z2 = Q4$$

There may be further equations that are similar to these equations if more chips depend on any X, Y or Z value. Plus, there would be additional sets of these equations for each diversity antenna that is used for reception. In matrix notation, the above equations can be reduced to the following form (equation no. 6):

$$[A] \begin{pmatrix} X1 \\ Y1 \\ Z1 \\ X2 \\ Y2 \\ Z2 \end{pmatrix} = (R)$$

Ultimately, to have a very efficient process, it is desired to find a pair of symbols (X1,Y1,Z1), (X2,Y2,Z2) that satisfy these equations with minimum mean square error, with the constraint that the symbol coordinates must be equal to those of one of the allowed diamond constellation points. This can be called the Maximum Likelihood result. The Maximum Likelihood result can be found using a brute force method, by trying all 64×64 combinations; however, a reduced complexity technique can be used which includes hypothesizing one symbol, solving for unconstrained values of the other symbol, and then quantizing these to the nearest symbol (see also the aforementioned U.S. patent application Ser. No. 12/035,970). In this way, only 64 candidate symbol pairs are developed for testing to see which candidate best matches the above equations in the least squares sense. The least squares solution is only Maximum Likelihood however when the noise on each of the received values I1, Q1, I2, Q2, I3, Q3, I4, Q4 . . . is uncorrelated and of the same variance. If not, then a weighted least-squares solution may be required which weights the squared error from each equation differently, or linearly combines the error from two equations before squaring. For instance, the correct weighting can be achieved by multiplying both sides of the previously mentioned matrix equation by the square root of the inverse of a noise correlation matrix.

The noise correlation matrix has elements ij which are the expected or mean values of noise(i)×noise(j) and is a square matrix of size 8×8 if there are eight equations. The square root of the noise correlation matrix may be found by expressing it in the form: [E] [Λ] [E]$^{\#}$ where [E] is a matrix of its eigenvectors and [Λ] is a diagonal matrix of the corresponding eigenvalues. The inverse square root is then found by replacing each element of [Λ] by the reciprocal of its square root. When this particular 8×8 matrix is multiplied to both sides of the above matrix equation, then the equations will still be 8 in number for 6 unknowns, however their solution is now a correctly weighted least-squares solution that accounts for the correlation between the noise terms.

Now consider using further signal samples that do not depend on any X, Y or Z coordinate to be found, but which are corrupted by noise correlated with the noise on the other received samples. This can be represented by the following equations such as (collectively referred below as equation no. 7):

$$A11.X1+A12.Y1+A13.Z1+A14.X2+A15.Y2+A16.Z2=I1$$

$$A21.X1+A22.Y1+A23.Z1+A24.X2+A25.Y2+A26.Z2=Q1$$

$$A31.X1+A32.Y1+A33.Z1+A34.X2+A15.Y2+A16.Z2=I2$$

$$A41.X1+A42.Y1+A43.Z1+A44.X2+A45.Y2+A46.Z2=Q2$$

$$A51.X1+A52.Y1+A53.Z1+A54.X2+A55.Y2+A56.Z2=I3$$

$$A61.X1+A62.Y1+A63.Z1+A64.X2+A65.Y2+A66.Z2=Q3$$

$$A71.X1+A72.Y1+A73.Z1+A74.X2+A75.Y2+A76.Z2=I4$$

$$A81.X1+A82.Y1+A83.Z1+A84.X2+A85.Y2+A86.Z2=Q4$$

$$01.X1+0.dddY1+0.Z1+0.X2+0.Y2+0.Z2=In$$

The result as can be seen in equation no. 7 is to append one or more zero rows to the A-matrix, extending it to from an 8×6 to a 9×6 for example. Now the noise correlation matrix would also be extended to 9×9, and the extra elements are non-zero. When the extended A-matrix is multiplied by the inverse square root of the noise correlation matrix, then the zero row becomes a non-zero row, with the result that the number of equations now to be solved in the least squares sense is larger. One desirable solution is to use all signal samples that depend in any way on the X, Y, Z coordinates of the two symbols to be decoded, plus all signal samples that do not depend on the X, Y, Z coordinates of any other unknown to be found, but which may bear noise or impairment correlated to the noise or impairment on the samples which do depend on the symbols to be found. Using this complete set of equations effectively uses all of the available information in the received signal.

It should be realized that the matrix operations described above do not have to be performed for each of the 64 symbol hypotheses, but instead may be carried out only once to obtain (equation no. 8):

$$\begin{matrix} X1 \\ Y1 \\ Z1 \end{matrix} = \begin{matrix} Xo \\ Yo \\ Zo \end{matrix} - [B] \times \begin{matrix} X2 \\ Y2 \\ Z2 \end{matrix}$$

where (X2,Y2,Z2) is the hypothesized symbol to be subtracted, (Xo,Yo,Zo) is pre-computed from the first three columns of the expanded A-matrix, denoted by Adim, and the received signal vector R is denoted by (equation no. 9):

$$\begin{matrix} Xo \\ Yo \\ Zo \end{matrix} = [A_{dim}^{\#} \cdot A_{dim}]^{-1} A_{dim}^{\#} \cdot R$$

and the 3×3 matrix B is given by (equation no. 10):

$$[B]=[A_{dim}^{\#} \cdot A_{dim}]^{-1} A_{dim}^{\#} \cdot A'_{dim}$$

where $A'_{dim}$ is the last three columns of the expanded A-matrix.

Thus only equation no. 8 would be calculated for each symbol hypothesis (X2, Y2, Z2). Furthermore, the matrix operations do not even necessarily have to be computed every code period, if the A-matrix elements and the noise correlation matrix change more slowly than once per symbol. In the case where the A matrix is the same for many symbols, then the same would be true for the B-matrix, and thus the product of B with the 64 symbol hypotheses can be done once and the stored results used for several code periods.

Figure 17:
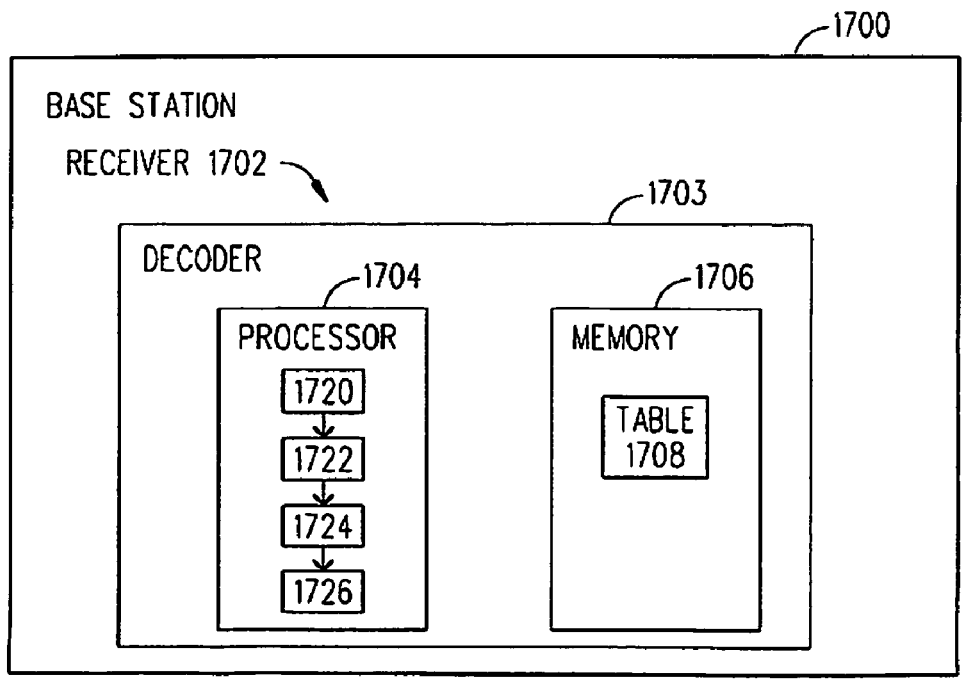
FIG. 17 is a block diagram of a base station with a receiver that is configured in accordance with another embodiment of the present invention.

Referring to FIG. 17, there is shown a base station 1700 with a receiver 1702 that decodes a radio signal in accordance with another embodiment of the present invention (note: only the receiver's components-functions that are relevant to the present invention have been described herein). In this embodiment, assume the mobile phone transmitter 902 generated the radio signal using the technique where a majority of the constellation points are on the surface of the diamond-shaped constellation that is defined in a three-dimensional space with coordinate axes X, Y and Z spaced by the boundary equation |x|+|y|+|Z|=1. The receiver 1702 has a decoder 1703 with a processor 1704 which implements processor-executable instructions from a memory 1706 to decode the received radio signal by: (a) determining a facet of the diamond shape constellation on or within which a transmitted data symbol lies (see step 1720); (b) determining a subset of points on the facet within which the symbol lies (step 1722); (c) determining the point within the subset lying closest to the received coordinate values of the transmitted symbol (step 1724); and (d) determining the transmitted symbol from the combination of the facet, the subset and the closest point (step 1726). In one case, the transmitted symbol can be determined by using a look-up table 1708 which is addressed by using the facet number, the subset number and the closest point number.

In comparing this receiver 1702 to the aforementioned receiver 1302 the previously discussed receiver 1302 would typically be used when the mobile phone transmitter 902 generated the radio signal using anyone one of the following encoding techniques:

(1) The transmitted radio signal has data symbols that are associated to a pair of constellation points, the first constellation point being selected from a first set of constellation points a majority of which lie on the surface of a first diamond-shaped constellation that is defined in a three dimensional space with coordinate axes I1, I2 and I3 by the boundary equation |I1|+|I2|+|I3|=1, and the second constellation point being selected from a second set of constellation points a majority of which lie on the surface of a second diamond-shaped constellation defined in a second three-dimensional space with coordinate axes Q1, Q2 and Q3 by the equations |Q1|+|Q2|+|Q3|=1.

(2) The transmitted radio signal has data symbols that are associated to a pair of constellation points, the first constellation point being selected from a first set of constellation points a majority of which lie on the surface of a first diamond-shaped constellation defined in a three dimensional space with coordinate axes I1, I2 and I3 by the boundary equation |I1|+|I2|+|I3|=A, and the second constellation point being selected from a second set of constellation points a majority of which lie on the surface of a second diamond-shaped constellation defined in a second three-dimensional space with coordinate axes Q1, Q2 and Q3 by the equations |Q1|+|Q2|+|Q3|=B, where the sum of the squares of A and B is less or equal to a desired maximum value.

Then, the receiver 1302 is able to decode the received radio signal by using a processor 1306 which implements processor-executable instructions from a memory 1308 to perform the following steps: (a) hypothesizing the first of the constellation points and determining the second constellation point, given the hypothesized constellation point; (b) determining a metric describing how accurately the hypothesized constellation point and the associated determined second constellation point predict the received signal; and (c) comparing the metric for all possible hypotheses of the first constellation point and selecting the hypothesis having the best metric as the correct hypothesis, thereby decoding the radio signal. A more detailed discussion about this particular decoding technique has been provided above with respect to FIGS. 13-16.

Further variations in the diamond constellation will now be described which can considered either for lowering bit error rate, further reducing the peak-to-rms ratio, or increasing the number of bits transmitted. A diamond pattern may be constructed by stacking successive square layers of spheres on top of each other, the sphere radius being half the desired minimum distance. The number of spheres in each layer increases as an integer squared, i.e. 1, 4, 9, 16, 25 . . . . . Thus, starting with a rectangular array of 5×5=25 spheres, a layer of 4×4=16 is stacked above and below it, followed by a layer of 3×3=9 spheres, then 2×2 and finally 1. The total number of spheres in this diamond pattern is thus 1+4+9+16+25+16+9+4+1=66 as shown in FIG. 6. However, diamond constellations of other sizes can be constructed as listed below, with an assumption of a sphere radius of $0.25/\sqrt{2}$.

| Order | Constellation | total pts | surface pts | Max (|x| + |y| + |z|) |
|---|---|---|---|---|
| 0 | 1 | 1 | 1 | 0 |
| 1 | 1 + 4 + 1 | 6 | 6 | 0.25 |
| 2 | 1 + 4 + 9 + 4 + 1 | 19 | 18 | 0.5 |
| 3 | 1 + 4 + 9 + 16 + 9 + 4 + 1 | 44 | 38 | 0.75 |
| 4 | 1 + 4 + 9 + 16 + 25 + 16 + 9 + 4 + 1 | 85 | 66 | 1.0 |
| 5 | 1 + 4 + 9 + 16 + 25 + 36 + 25 + 16 + 9 + 4 + 1 | 146 | 102 | 1.25 |

As can be seen, the constellation of order N contains the constellation of order N-2 within it, and they are different points with different coordinates than the order N-1 constellation.

The first diamond constellation 600 that was described above had a 85/66 point pattern of order 4 where only the 66 surface points were used with any two deleted. It was then discussed where it was advantageous to delete six surface points, e.g. the six vertices, and to replace them with the six points of the order 1 constellation, which are contained well within the outer points and do not violate minimum distance requirements. Thus, the diamond constellation 800 with depressed vertices was produced as shown in FIG. 8. A further dimpled diamond constellation 1200 was shown in FIG. 12, in which the vertices and edge-center points were inset, thereby producing an order-2 constellation which included 18 internal points.

Many other such modifications to the diamond constellation can be considered and tested to determine the peak-to-rms and $d_{min}$-to-rms performance ratios. However, some useful combinations can be found by realizing that a more general measure of transmitter peak amplitude to be constrained is the square amplitude $(I1+I2+I3)^2+(Q1+Q2+Q3)^2$. Thus, in using the order=4 diamond constellation for both symbols, in which both the sum of the I-values and the sum of the Q-values are constrained to be less or equal to unity, then the square of the amplitude is constrained to be less or equal to 2. If on the other hand one of the symbols was selected from the order=3 diamond constellation and one from the order=5 diamond constellation, then the squared amplitude would be less or equal to $1.25^2+0.75^2=2.125$ which is a peak value only about 0.25 db greater than the two order=4 diamond constellations. The number of distinct points available is then 44×146+102×44=10192, which is 2720 more than the 8192 required to encode 13 bits. As such, for a first set of 13-bit patterns, a first point would be selected from the order=3 diamond constellation together with a second point from the order=5 diamond constellation, with the reverse for the remaining 13-bit patterns, while avoiding counting twice the case where both points are selected from the inner 44 of the order=5 diamond constellation. In fact, there are sufficient points to encode 13 bits if one point is selected from the order=3 diamond constellation (the inner 44 of the order=5 diamond constellation) and the other point is selected only from among the 102 surface points of the order=5 diamond constellation.

In another variation, 12 bits can be encoded by selecting one point from among 32 of the order=3 diamond constellation and the other point from among 64 of the order=4 diamond constellation, or vice versa, thus giving 32×64+64×32 distinct combinations. For this case, the peak square amplitude would be $1+0.75^2=1.5625$, which is 1.07 dB less than selecting both points from the order=4 diamond constellation. Many different variations can be produced and simulated, after allocating Grey coding as well as possible given the constellation, or allocating symbols to data in some other way depending on the application (e.g., PCM, speech, ASCII text etc). All such variations can be designed to limit the peak-to-rms ratio while preserving communications efficiency in accordance with the present invention.

From the foregoing, it should be appreciated that the present invention relates to a transmitter and a method for generating a radio signal with a reduced ratio of peak amplitude to root-mean-square amplitude which helps to improve the transmit efficiency of the transmitter's power amplifier. In one embodiment, the method of communicating data symbols resulting in a transmitted signal with a reduced ratio of peak amplitude to root-mean-square amplitude includes the steps of: (a) simultaneously using multiple, additively-combined, spread-spectrum codes each carrying an In-phase or real signal value and a Quadrature phase or imaginary signal value to provide at least three independent modulation dimensions, each dimension carrying a coordinate value; and (b) defining a set of constellation points to be associated with the data symbols, the constellation points distributed within a space comprised of the at least three dimensions such that an Euclidean distance between any two of the constellation points is not less than a desired minimum and such that a desired peak amplitude value is not exceeded by any point, the peak value being determined by any of the following measures: (i) a sum of absolute values of the coordinates of any constellation point corresponding to the dimensions provided by the real signal values carried by the multiple, additively-combined, spread-spectrum codes; (ii) a sum of the absolute values of the coordinates of any constellation point corresponding to the dimensions provided by the imaginary signal values carried by the multiple, additively-combined, spread-spectrum codes; and (iii) a sum of the squares of (a) the sum of the absolute values of the coordinates of any constellation point corresponding to the dimensions provided by the real signal values carried by the multiple, additively-combined, spread-spectrum codes; and (b) the sum of the absolute values of the constellation coordinates of any point corresponding to the dimensions provided by the imaginary signal values carried by the multiple, additively-combined, spread-spectrum codes. As described herein, the transmitter transmits a signal that comprises the linear sum of at least three orthogonal components. In one implementation the three orthogonal components comprise three orthogonal bit patterns; in another implementation, the three orthogonal components comprise first and second mutually orthogonal codes, the second code being transmitted on both an in-phase carrier and a quadrature phase carrier.

Although several embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as set forth and defined by the following claims.

The invention claimed is:

1. A method for communicating data symbols resulting in a transmitted radio signal with a reduced ratio of peak amplitude to root-mean-square amplitude, said method comprising the steps of:

simultaneously using multiple, additively-combined, spread-spectrum codes each carrying an In-phase or real signal value and a Quadrature phase or imaginary signal value to provide at least three independent modulation dimensions, each dimension carrying a coordinate value;

defining a set of constellation points to be associated with the data symbols, the constellation points distributed within a space comprised of the at least three dimensions such that a Euclidean distance between any two of the constellation points is not less than a desired minimum and such that a desired peak amplitude value is not exceeded by any point, the peak value being determined by any of the following measures:

a sum of absolute values of the coordinates of any constellation point corresponding to the dimensions provided by the real signal values carried by the multiple, additively-combined, spread-spectrum codes;

a sum of the absolute values of the coordinates of any constellation point corresponding to the dimensions provided by the imaginary signal values carried by the multiple, additively-combined, spread-spectrum codes; and a sum of the squares of (a) the sum of the absolute values of the coordinates of any constellation point corresponding to the dimensions provided by the real signal values carried by the multiple, additively-combined, spread-spectrum codes; and (b) the sum of the absolute values of the constellation coordinates of any point corresponding to the dimensions provided by the imaginary signal values carried by the multiple, additively-combined, spread-spectrum codes;

wherein a majority of the constellation points are on an outer surface of a diamond-shaped constellation defined in a three-dimensional space with coordinate axes X, Y and Z, the outer surface of the diamond-shaped constellation being defined by the boundary equation $|X|+|Y|+|Z|=1$;

further comprising the steps of receiving and decoding said radio signal including the steps of:

determining a facet of the diamond-shaped constellation on or within which a transmitted data symbol lies;

determining a subset of points on the facet within which the transmitted data symbol lies;

determining a point within the subset of points which is closest to the received coordinate values of the transmitted data symbol; and determining the transmitted data symbol from the combination of the facet, the subset of points, and the closest point, wherein said step of determining the transmitted data symbol further includes using a look-up table which is addressed by a facet number, a subset of points number and a closest point number.

2. A method for communicating data symbols resulting in a transmitted radio signal with a reduced ratio of peak amplitude to root-mean-square amplitude, said method comprising the steps of:

simultaneously using multiple, additively-combined, spread-spectrum codes each carrying an In-phase or real signal value and a Quadrature phase or imaginary signal value to provide at least three independent modulation dimensions, each dimension carrying a coordinate value;

defining a set of constellation points to be associated with the data symbols, the constellation points distributed within a space comprised of the at least three dimensions such that a Euclidean distance between any two of the constellation points is not less than a desired minimum and such that a desired peak amplitude value is not exceeded by any point, the peak value being determined by any of the following measures:

a sum of absolute values of the coordinates of any constellation point corresponding to the dimensions provided by the real signal values carried by the multiple, additively-combined, spread-spectrum codes;

a sum of the absolute values of the coordinates of any constellation point corresponding to the dimensions provided by the imaginary signal values carried by the multiple, additively-combined, spread-spectrum codes; and a sum of the squares of (a) the sum of the absolute values of the coordinates of any constellation point corresponding to the dimensions provided by the real signal values carried by the multiple, additively-combined, spread-spectrum codes; and (b) the sum of the absolute values of the constellation coordinates of any point corresponding to the dimensions provided by the imaginary signal values carried by the multiple, additively-combined, spread-spectrum codes; and associating said data symbols to a pair of constellation points, the first constellation point selected from a first set of constellation points a majority of which lie on the surface of a first diamond-shaped constellation defined in a three dimensional space with coordinate axes I1, I2 and I3 by a boundary equation $|I1|+|I2|+|I3|=1$, and the second constellation point selected from a second set of constellation points a majority of which lie on the surface of a second diamond-shaped constellation defined in a second three dimensional space with coordinate axes Q1, Q2 and Q3 by a boundary equation $|Q1|+|Q2|+|Q3|=1$.

3. The method of claim 2, further comprising the steps of receiving and decoding said radio signal including the steps of:

hypothesizing the first of said constellation points and determining the second constellation point, given the hypothesized constellation point;

determining a metric describing how accurately the hypothesized constellation point and the associated determined second constellation point predict the received radio signal;

comparing the metric for all possible hypotheses of the first constellation point and selecting the hypothesis having the best metric as the correct hypothesis, thereby decoding said radio signal.

4. A method for communicating data symbols resulting in a transmitted radio signal with a reduced ratio of peak amplitude to root-mean-square amplitude, said method comprising the steps of:

simultaneously using multiple, additively-combined, spread-spectrum codes each carrying an In-phase or real signal value and a Quadrature phase or imaginary signal value to provide at least three independent modulation dimensions, each dimension carrying a coordinate value;

defining a set of constellation points to be associated with the data symbols, the constellation points distributed within a space comprised of the at least three dimensions such that a Euclidean distance between any two of the constellation points is not less than a desired minimum and such that a desired peak amplitude value is not exceeded by any point, the peak value being determined by any of the following measures:

a sum of absolute values of the coordinates of any constellation point corresponding to the dimensions provided by the real signal values carried by the multiple, additively-combined, spread-spectrum codes;

a sum of the absolute values of the coordinates of any constellation point corresponding to the dimensions provided by the imaginary signal values carried by the multiple, additively-combined, spread-spectrum codes; and a sum of the squares of (a) the sum of the absolute values of the coordinates of any constellation point corresponding to the dimensions provided by the real signal values carried by the multiple, additively-combined, spread-spectrum codes; and (b) the sum of the absolute values of the constellation coordinates of any point corresponding to the dimensions provided by the imaginary signal values carried by the multiple, additively-combined, spread-spectrum codes; and associating said data symbols to a pair of constellation points, the first constellation point selected from a first set of constellation points a majority of which lie on the surface of a first diamond-shaped constellation defined in a three dimensional space with coordinate axes I1, I2 and I3 by a boundary equation $|I1|+|I2|+|I3|=A$, and the second constellation point selected from a second set of constellation points a majority of which lie on the surface of a second diamond-shaped constellation defined in a second three-dimensional space with coordinate axes Q1, Q2 and Q3 by a boundary equation $|Q1|+|Q2|+|Q3|=B$, wherein the sum of the squares of A and B is less or equal to a desired maximum value.

5. The method of claim 4, further comprising the steps of receiving and decoding said radio signal including the steps of:

hypothesizing the first of said constellation points and determining the second constellation point, given the hypothesized constellation point;

determining a metric describing how accurately the hypothesized constellation point and the associated determined second constellation point predict the received radio signal;

comparing the metric for all possible hypotheses of the first constellation point and selecting the hypothesis having the best metric as the correct hypothesis, thereby decoding said radio signal.

6. A method for reducing a peak-to-rms ratio in a transmitted radio signal while placing a limit on the peak composite symbol amplitude when utilizing multi-dimensional modulation, said method comprising the steps of:

encoding information into a stream of binary bits;

forming a plurality of groups of bits from the stream of binary bits, wherein the plurality of groups of bits represent a plurality of data symbols;

representing each data symbol by a set of coordinates in a multidimensional space, wherein a number of dimensions in the multidimensional space correspond to a number of at least three orthogonal components which eventually comprise the transmitted radio signal;

choosing coordinates for each data symbol such that each data symbol is located at a minimum distance away from a nearest other data symbol in the multidimensional space and also such that the peak composite symbol amplitude to root-mean-square amplitude of the transmitted radio signal is minimized, wherein the multidimensional space is defined by a diamond-shaped constellation with depressed vertices.

7. A method for reducing a peak-to-rms ratio in a transmitted radio signal while placing a limit on the peak composite symbol amplitude when utilizing multi-dimensional modulation, said method comprising the steps of:
- encoding information into a stream of binary bits;
- forming a plurality of groups of bits from the stream of binary bits, wherein the plurality of groups of bits represent a plurality of data symbols;
- representing each data symbol by a set of coordinates in a multidimensional space, wherein a number of dimensions in the multidimensional space correspond to a number of at least three orthogonal components which eventually comprise the transmitted radio signal;
- choosing coordinates for each data symbol such that each data symbol is located at a minimum distance away from a nearest other data symbol in the multidimensional space and also such that the peak composite symbol amplitude to root-mean-square amplitude of the transmitted radio signal is minimized, wherein the multidimensional space is defined by a dimpled-diamond-shaped constellation.

8. A transmitter that reduces a peak-to-rms ratio in a radio signal while placing a limit on the peak composite symbol amplitude when utilizing multi-dimensional modulation, said transmitter comprising:
- an encoder that divides groups of data bits into a first subgroup and a second subgroup;
- said encoder uses the first subgroup of bits to select one of a number of constellation points that are distributed within a first multi-dimensional space, where a location of the constellation points have been determined such that a sum of their coordinates is less than a desired maximum value, and the coordinates of the selected constellation point are used to set values of real parts of corresponding complex numbers;
- said encoder uses the second subgroup of bits to select another one of a number of constellation points that are distributed within a second multidimensional space, where a location of the constellation points have been determined such that a sum of their coordinates is less than a desired maximum value, and the coordinates of the selected constellation point are then used to set values of imaginary parts of corresponding complex numbers;
- said encoder pairs one real and one imaginary part to form a complex number and the remaining real and imaginary parts are paired likewise to obtain a set of complex numbers;
- said encoder assigns the complex numbers to be multiplied by an associated one of a number of multi-chip orthogonal codes, where products of each complex number with its code are subsequently added chip-wise to obtain a multi-code symbol;
- a filter that receives a stream of the multicode symbols and filters them to constrain a transmitted spectrum;
- a modulator that modulates the filtered signal with a radio frequency carrier; and
- an antenna that transmits the modulated radio signal, wherein each multidimensional space is defined by a diamond-shaped constellation with depressed vertices.

9. A transmitter that reduces a peak-to-rms ratio in a radio signal while placing a limit on the peak composite symbol amplitude when utilizing multi-dimensional modulation, said transmitter comprising:
- an encoder that divides groups of data bits into a first subgroup and a second subgroup;
- said encoder uses the first subgroup of bits to select one of a number of constellation points that are distributed within a first multi-dimensional space, where a location of the constellation points have been determined such that a sum of their coordinates is less than a desired maximum value, and the coordinates of the selected constellation point are used to set values of real parts of corresponding complex numbers;
- said encoder uses the second subgroup of bits to select another one of a number of constellation points that are distributed within a second multidimensional space, where a location of the constellation points have been determined such that a sum of their coordinates is less than a desired maximum value, and the coordinates of the selected constellation point are then used to set values of imaginary parts of corresponding complex numbers;
- said encoder pairs one real and one imaginary part to form a complex number and the remaining real and imaginary parts are paired likewise to obtain a set of complex numbers;
- said encoder assigns the complex numbers to be multiplied by an associated one of a number of multi-chip orthogonal codes, where products of each complex number with its code are subsequently added chip-wise to obtain a multi-code symbol;
- a filter that receives a stream of the multicode symbols and filters them to constrain a transmitted spectrum;
- a modulator that modulates the filtered signal with a radio frequency carrier; and
- an antenna that transmits the modulated radio signal, wherein each multidimensional space is defined by a dimpled-diamond-shaped constellation.

10. A receiver that decodes a radio signal which has a reduced peak-to-rms ratio and a limited peak composite symbol amplitude, said receiver comprising:
- a decoder with a processor that implements processor-executable instructions from a memory to decode the radio signal by:
- hypothesizing a first of multiple constellation points on a first diamond-shaped constellation where the first constellation point is associated with a data symbol of the radio signal;
- given the hypothesized first constellation point, determining a second constellation point on a second diamond-shaped constellation where the second constellation point is associated with a data symbol of the radio signal;
- determining a metric describing how accurately said hypothesized first constellation point and the associated determined second constellation point predict the received radio signal; and
- comparing said metric for all possible hypotheses of said first constellation point and selecting the hypothesis having the best metric as the correct hypothesis, thereby decoding said radio signal.

11. The receiver of claim 10, wherein said first diamond-shaped constellation is defined in a three dimensional space with coordinate axes I1, I2 and I3 bound by a boundary equation $|I1|+|I2|+|I3|=1$, and said second diamond-shaped constellation is defined in a second three dimensional space with coordinate axes Q1, Q2 and Q3 bound by a boundary equation $|Q1|+|Q2|+|Q3|=1$.

12. The receiver of claim 10, wherein said first diamond-shaped constellation is defined in a three dimensional space with coordinate axes I1, I2 and I3 bound by a boundary equation $|I1|+|I2|+|I3|=A$, and said second diamond-shaped constellation is defined in a second three dimensional space with coordinate axes Q1, Q2 and Q3 bound by a boundary equation $|Q1|+|Q2|+|Q3|=B$, wherein the sum of the squares of A and B is less or equal to a desired maximum value.

* * * * *

UNITED STATES PATENT AND TRADEMARK OFFICE
CERTIFICATE OF CORRECTION

PATENT NO. : 8,014,436 B2
APPLICATION NO. : 12/166910
DATED : September 6, 2011
INVENTOR(S) : Dent It is certified that error appears in the above-identified patent and that said Letters Patent is hereby corrected as shown below:

In Column 7, Line 63, in Equation (1a), delete "$n_{max}$" and insert -- $\eta_{max}$ --, therefor.

In Column 8, Line 3, in Equation (1b), delete "$n_{max}$" and insert -- $\eta_{max}$ --, therefor.

In Column 8, Line 10, in Equation (2a), delete "n" and insert -- $\eta$ --, therefor.

In Column 12, Line 19, delete "11," and insert -- 11, 10 --, therefor.

In Column 15, Line 21, delete " | X | - | Y ⊕=0" and insert -- | X | - | Y | =0 --, therefor.

In Column 17, Lines 45-46, delete "A15.Y2+ A16.Z2=I2" and
insert -- A35.Y2+A36.Z2=I2 --, therefor.

In Column 17, Line 62, delete "0.dddY1" and insert -- 0.Y1 --, therefor.

Signed and Sealed this
Tenth Day of January, 2012

David J. Kappos
*Director of the United States Patent and Trademark Office*